(12) United States Patent
Cardon et al.

(10) Patent No.: US 10,335,865 B2
(45) Date of Patent: Jul. 2, 2019

(54) METHODS FOR PROCESSING A CONFINED AREA OF A WORKPIECE

(71) Applicant: The Boeing Company, Chicago, IL (US)

(72) Inventors: Lisa Cardon, Auburn, WA (US);
Daniel Long, Auburn, WA (US);
Franklin B. French, Auburn, WA (US)

(73) Assignee: The Boeing Company, Chicago, IL (US)

( * ) Notice: Subject to any disclaimer, the term of this patent is extended or adjusted under 35 U.S.C. 154(b) by 109 days.

(21) Appl. No.: 15/421,904

(22) Filed: Feb. 1, 2017

(65) Prior Publication Data

US 2017/0197253 A1  Jul. 13, 2017

Related U.S. Application Data

(62) Division of application No. 14/482,944, filed on Sep. 10, 2014, now Pat. No. 9,616,503.

(51) Int. Cl.
*B23B 47/26* (2006.01)
*B23B 41/00* (2006.01)
(Continued)

(52) U.S. Cl.
CPC .............. *B23B 47/26* (2013.01); *B23B 41/00* (2013.01); *B23Q 5/046* (2013.01); *B25J 11/005* (2013.01);
(Continued)

(58) Field of Classification Search
CPC ................. B25J 11/0055; B25J 11/005; Y10T 408/5623; Y10T 408/56245;
(Continued)

(56) References Cited

U.S. PATENT DOCUMENTS 596,471 A * 1/1898 Bonnett .................. B23B 47/28
408/85
2,598,106 A * 5/1952 Boyle ...................... B21J 15/14
29/26 R
(Continued)

FOREIGN PATENT DOCUMENTS

CN         2675308        2/2005
CN         201111454      9/2008
(Continued)

OTHER PUBLICATIONS

Japanese Patent Office, "Notification of Reasons for Rejection," with English translation, App. No. 2016-169000 (dated Jul. 19, 2018).

(Continued)

*Primary Examiner* — Ryan C Rufo
(74) *Attorney, Agent, or Firm* — Walters & Wasylyna LLC

(57) ABSTRACT

A method for processing a drilling location in a confined area of a workpiece along a drilling axis A using an end effector is disclosed. The method comprises positioning the end effector relative to the drilling location of the workpiece, clamping the workpiece between a clamp of the end effector and a pressure foot of the end effector, wherein the pressure foot supports the clamp movable relative to the pressure foot, and drilling the workpiece with a flat angle drill of the end effector.

20 Claims, 23 Drawing Sheets

(51) Int. Cl.
*B25J 11/00* (2006.01)
*B23Q 5/04* (2006.01)
*B25J 15/00* (2006.01)

(52) U.S. Cl.
CPC ....... *B25J 15/0095* (2013.01); *B23B 2215/04* (2013.01); *B23B 2250/12* (2013.01); *B23B 2270/08* (2013.01); *B23B 2270/62* (2013.01); *B25J 11/0055* (2013.01)

(58) Field of Classification Search
CPC ..... Y10T 408/56238; Y10T 408/56253; B23B 47/28; B23B 2270/08
USPC .......................................................... 483/901
See application file for complete search history.

(56) References Cited

U.S. PATENT DOCUMENTS

| | | | | |
|---|---|---|---|---|
| 2,909,949 | A * | 10/1959 | Winslow | B23B 51/0054 408/10 |
| 3,060,769 | A * | 10/1962 | Heider | B25H 1/0064 192/107 T |
| 3,162,091 | A | 12/1964 | Keller | |
| 3,518,901 | A * | 7/1970 | Wright | B23Q 5/046 144/93.1 |
| 4,601,618 | A * | 7/1986 | McEldowney | B23B 47/28 408/1 R |
| 4,679,969 | A * | 7/1987 | Riley | B25H 1/0057 408/103 |
| 4,890,962 | A * | 1/1990 | Nydegger | B23Q 5/32 408/103 |
| 4,948,308 | A * | 8/1990 | Giannuzzi | B25B 5/061 408/103 |
| 4,955,119 | A * | 9/1990 | Bonomi | B21J 15/10 227/58 |
| 5,169,047 | A * | 12/1992 | Endres | B21J 15/10 227/27 |
| 5,283,982 | A * | 2/1994 | Harper, Jr. | B23C 3/00 451/11 |
| 5,961,258 | A * | 10/1999 | Ende | B21J 15/10 408/100 |
| 9,168,592 | B1 * | 10/2015 | Stavig, Jr. | B23B 45/008 |
| 2005/0111927 | A1 * | 5/2005 | Morrison | B23B 47/28 408/103 |
| 2008/0277953 | A1 | 11/2008 | Condliff | |

FOREIGN PATENT DOCUMENTS

| | | |
|---|---|---|
| CN | 103517783 | 1/2014 |
| EP | 2461939 | 5/2013 |

OTHER PUBLICATIONS

The State Intellectual Property Office of China, "First Notification of Office Action," with English translation, App. No. 201510490060.0 (dated Jul. 3, 2018).

Japan Patent Office, Office Action, with English translation, App. No. 2015-169000 (dated Apr. 2, 2019).

* cited by examiner

METHODS FOR PROCESSING A CONFINED AREA OF A WORKPIECE

CROSS-REFERENCE TO RELATED APPLICATIONS

The present application is a divisional of and claims priority from U.S. Ser. No. 14/482,944 entitled: Apparatuses and Methods for Processing a Confined Area of a Workpiece, filed on Sep. 10, 2014, the entire contents of which are incorporated herein by reference.

BACKGROUND

An end effector is a device at the end of a robotic arm, designed to interact with the environment and/or a workpiece. The exact configuration of the end effector may depend on the particular application of the robot and/or the particular process be performed on the workpiece. Generally, the end effector may manipulate the workpiece and/or position one or more machining tools relative to the workpiece and/or a surface to be processed.

However, the configuration of the end effector utilized to manipulate and/or process the workpiece may make accessing a processing location, particularly one located in a confined area or near an obstruction, difficult or even impossible. Accordingly, certain operations may require manual processing, for example, utilizing hand tools. Manual processing of the workpiece may increase cost and process cycle time of the workpiece.

SUMMARY

Accordingly, apparatuses and methods, intended to address the above-identified concerns, would find utility.

The following is a non-exclusive list of examples of the subject matter according the present disclosure, which may or may not be claimed.

One example of the present disclosure relates to a method for processing a drilling location in a confined area of a workpiece along a drilling axis A using an end effector. The method comprises positioning the end effector relative to the drilling location of the workpiece, clamping the workpiece between a clamp of the end effector and a pressure foot of the end effector, wherein the pressure foot supports the clamp movable relative to the pressure foot, and drilling the workpiece with a flat angle drill of the end effector.

Another example of the present disclosure relates to a method for processing a drilling location in a confined area of a workpiece along a drilling axis A using an end effector. The method comprises positioning the end effector relative to the drilling location of the workpiece and clamping the workpiece between a clamp of the end effector and a pressure foot of the end effector, wherein the pressure foot supports the clamp movable relative to the pressure foot. The method also comprises biasing the pressure foot, supporting the clamp, with a force $F_5$ along the drilling axis A, wherein the force $F_5$ is directionally opposite to a gravitational force corresponding to a weight sum of a spindle of the end effector, a translation platform of the end effector, the pressure foot, a drill bracket of the end effector, a flat angle drill of the end effector, and the clamp. The method also comprises biasing the clamp toward the workpiece with a force $F_6$, wherein the force $F_6$ has a magnitude $M_6$ greater than an absolute value of a difference between a magnitude $M_5$ of the force $F_5$ and a magnitude $M_g$ of the gravitational force corresponding to the weight sum of the spindle, the translation platform, the pressure foot, the drill bracket, the flat angle drill, and the clamp. The method also comprises drilling the workpiece with the flat angle drill of the end effector.

BRIEF DESCRIPTION OF THE DRAWINGS

Figure 1A:
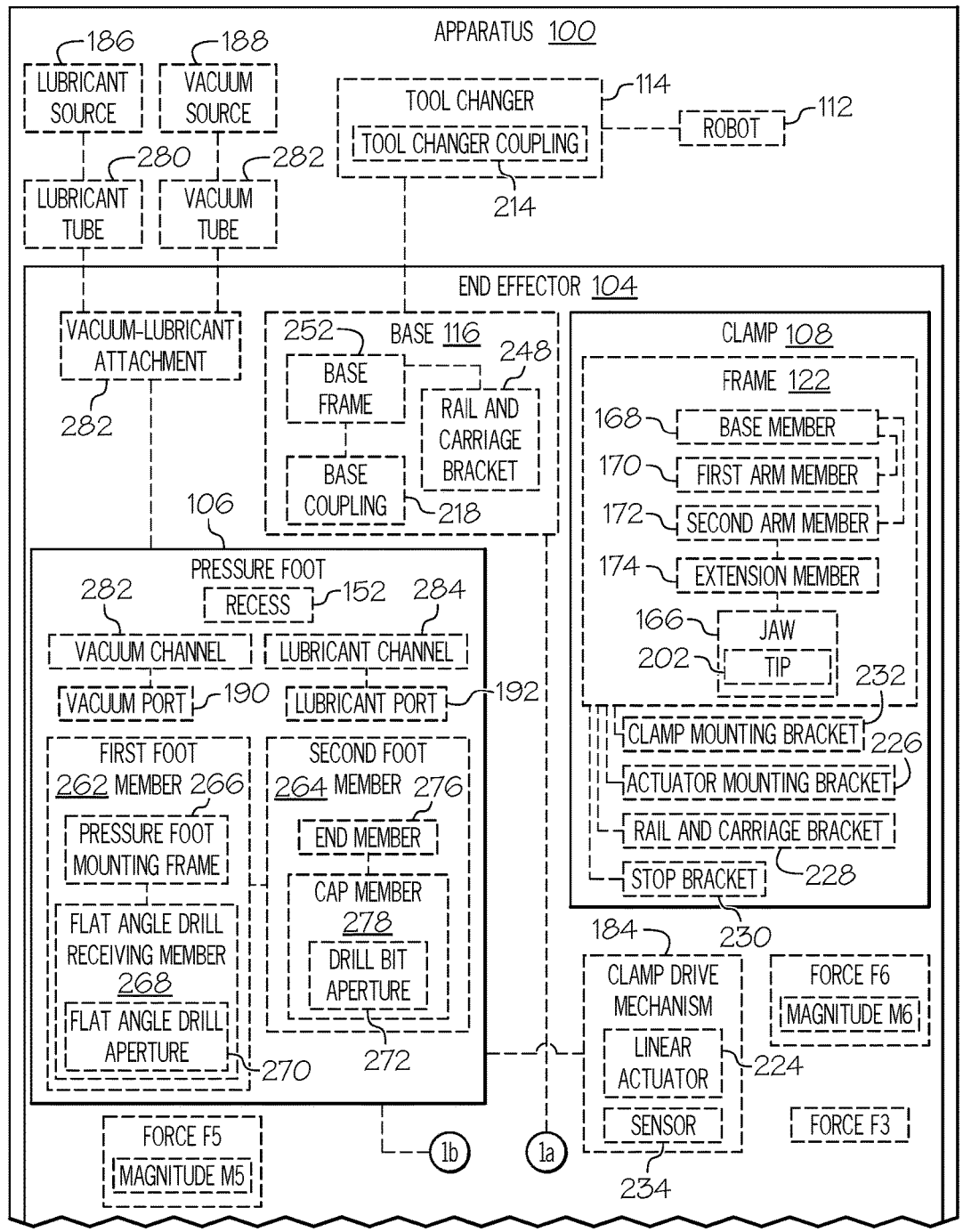
Figure 1B:
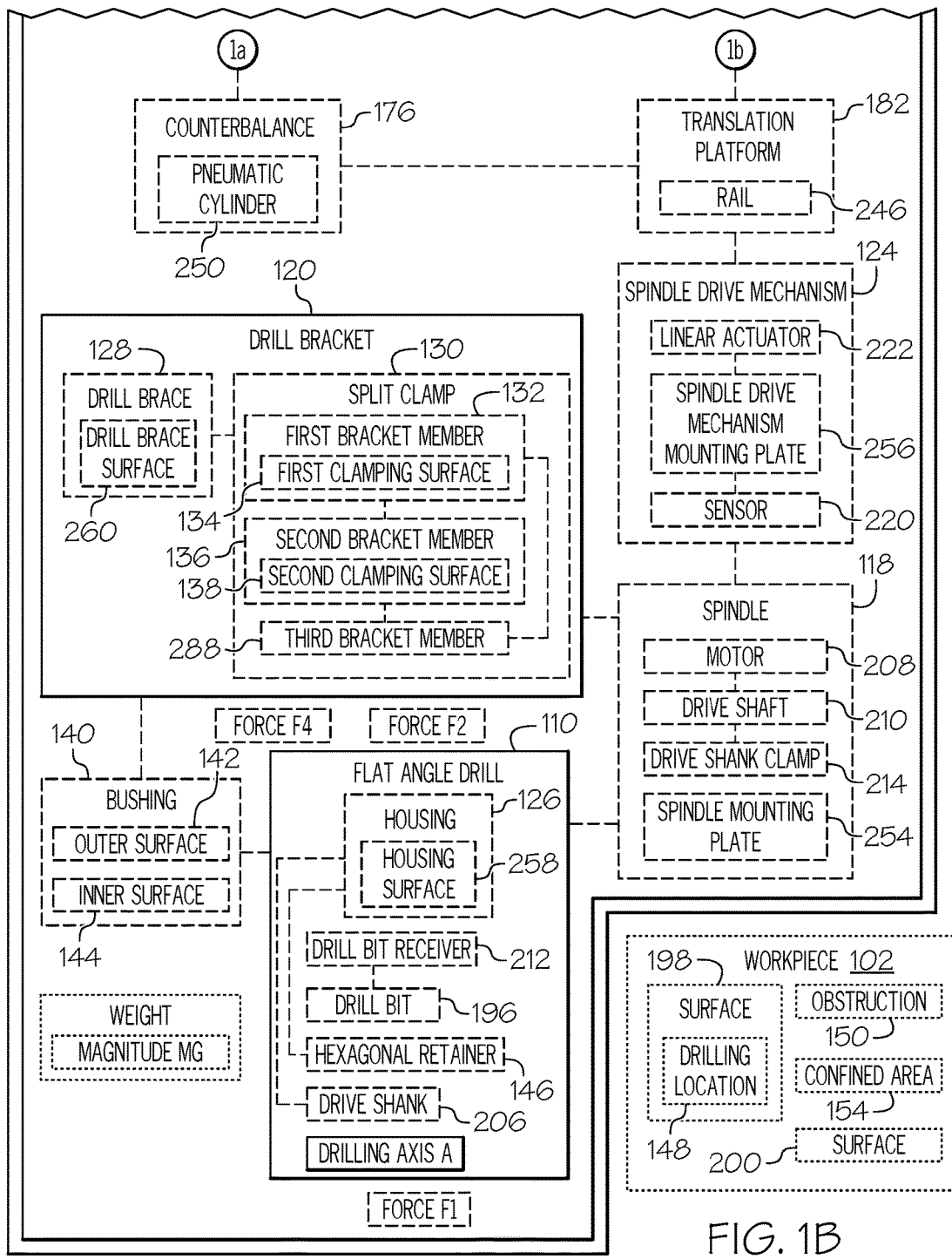
Figure 2:
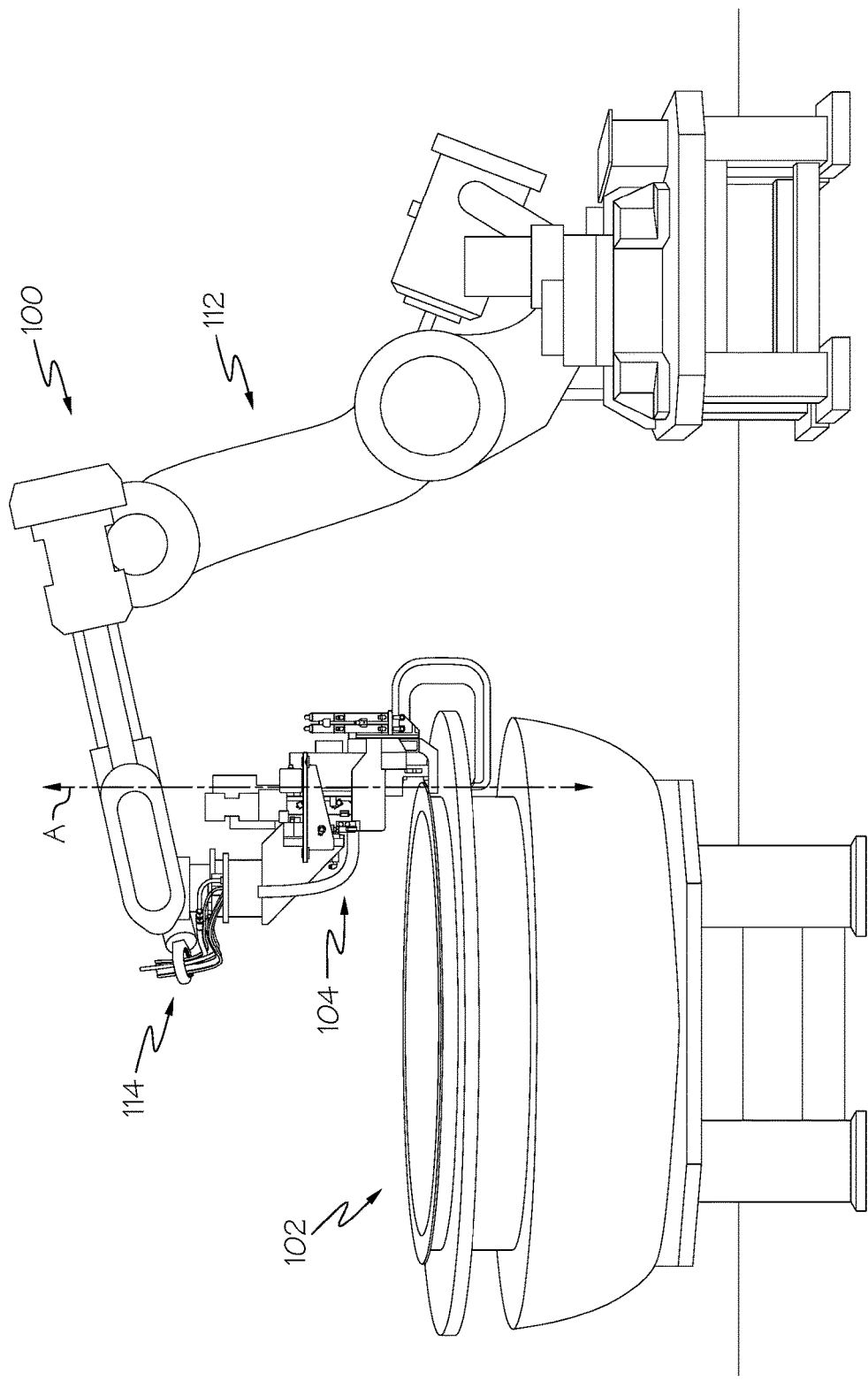
Figure 3:
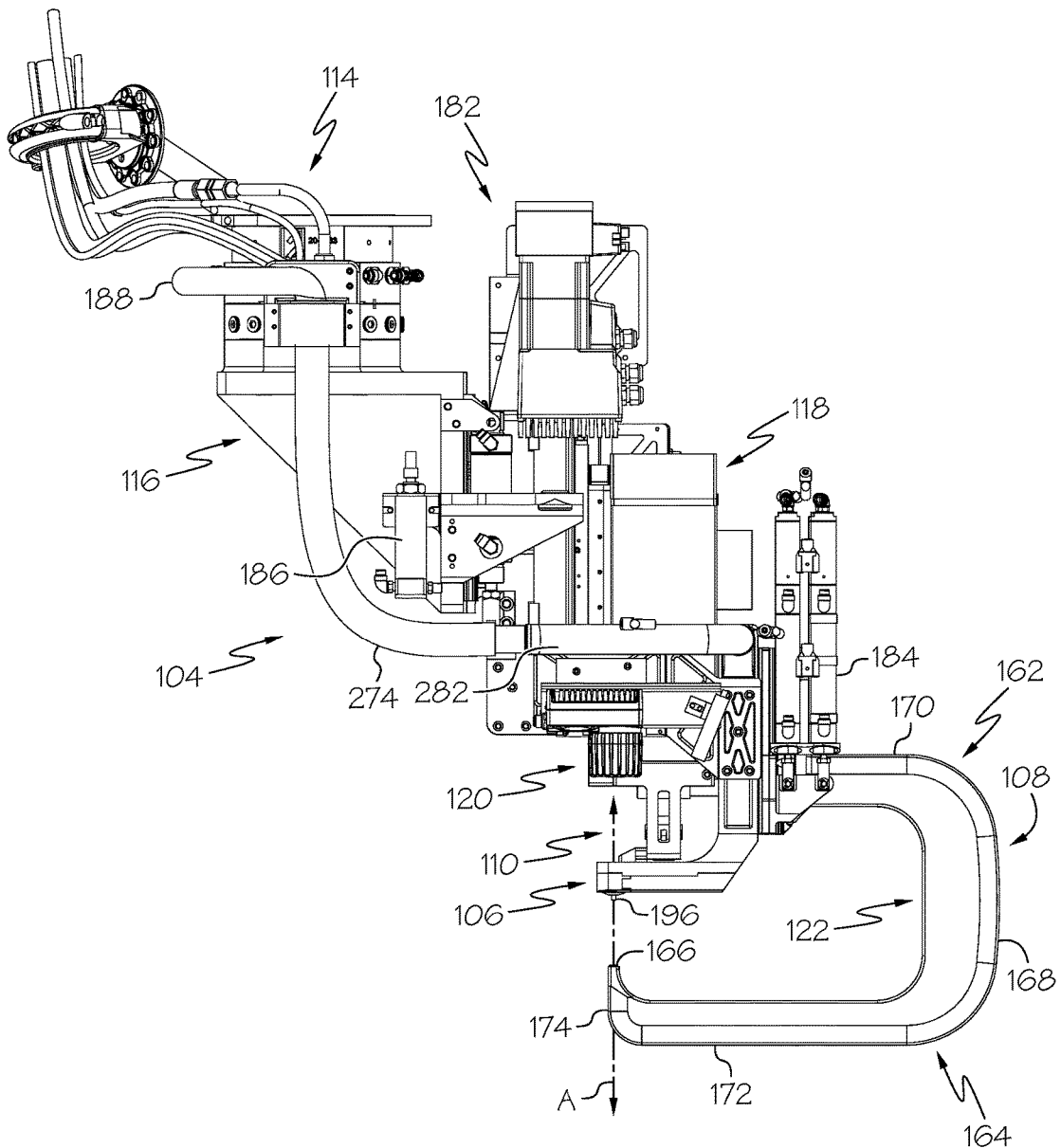
Figure 4:
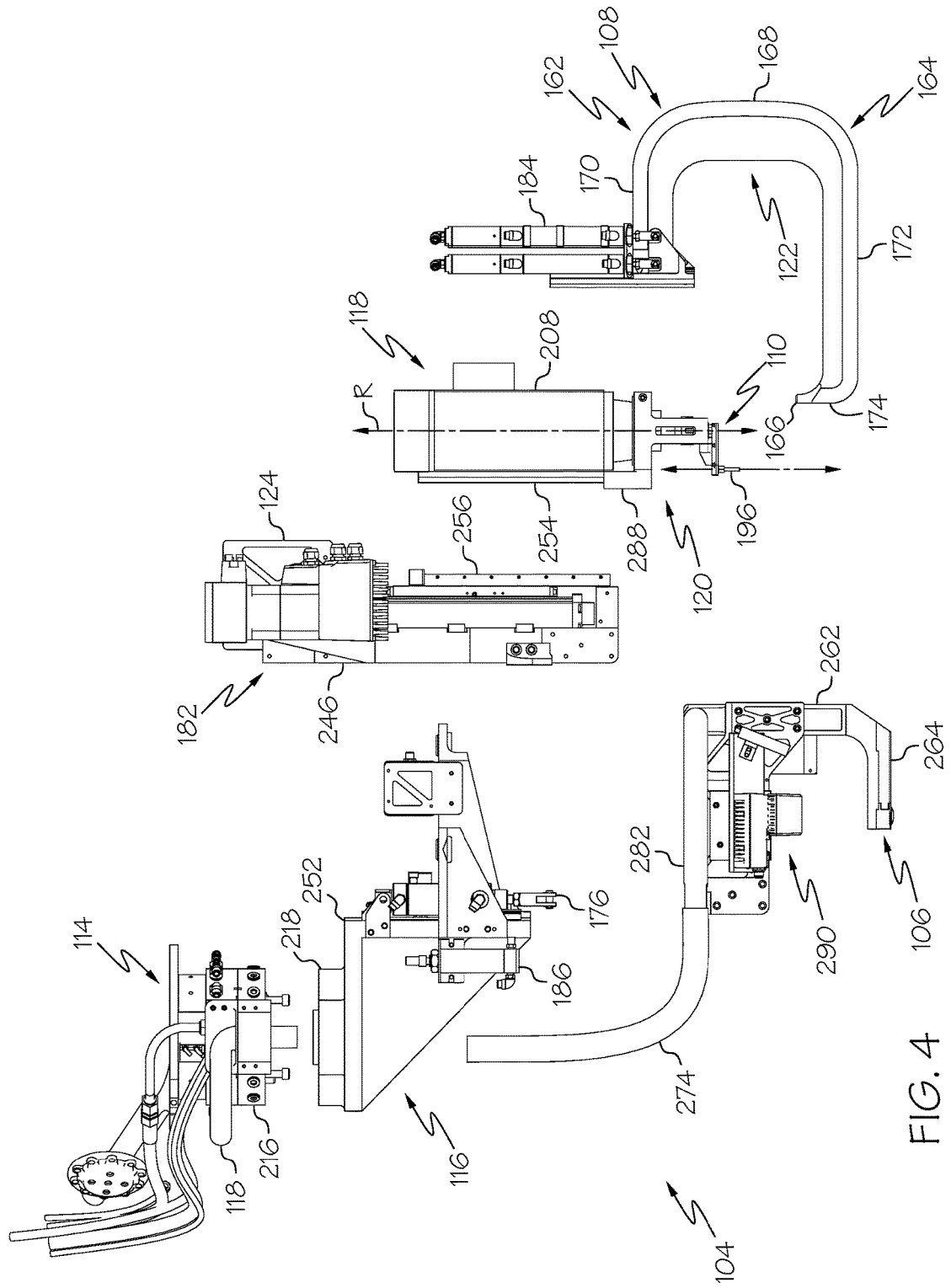
Figure 5:
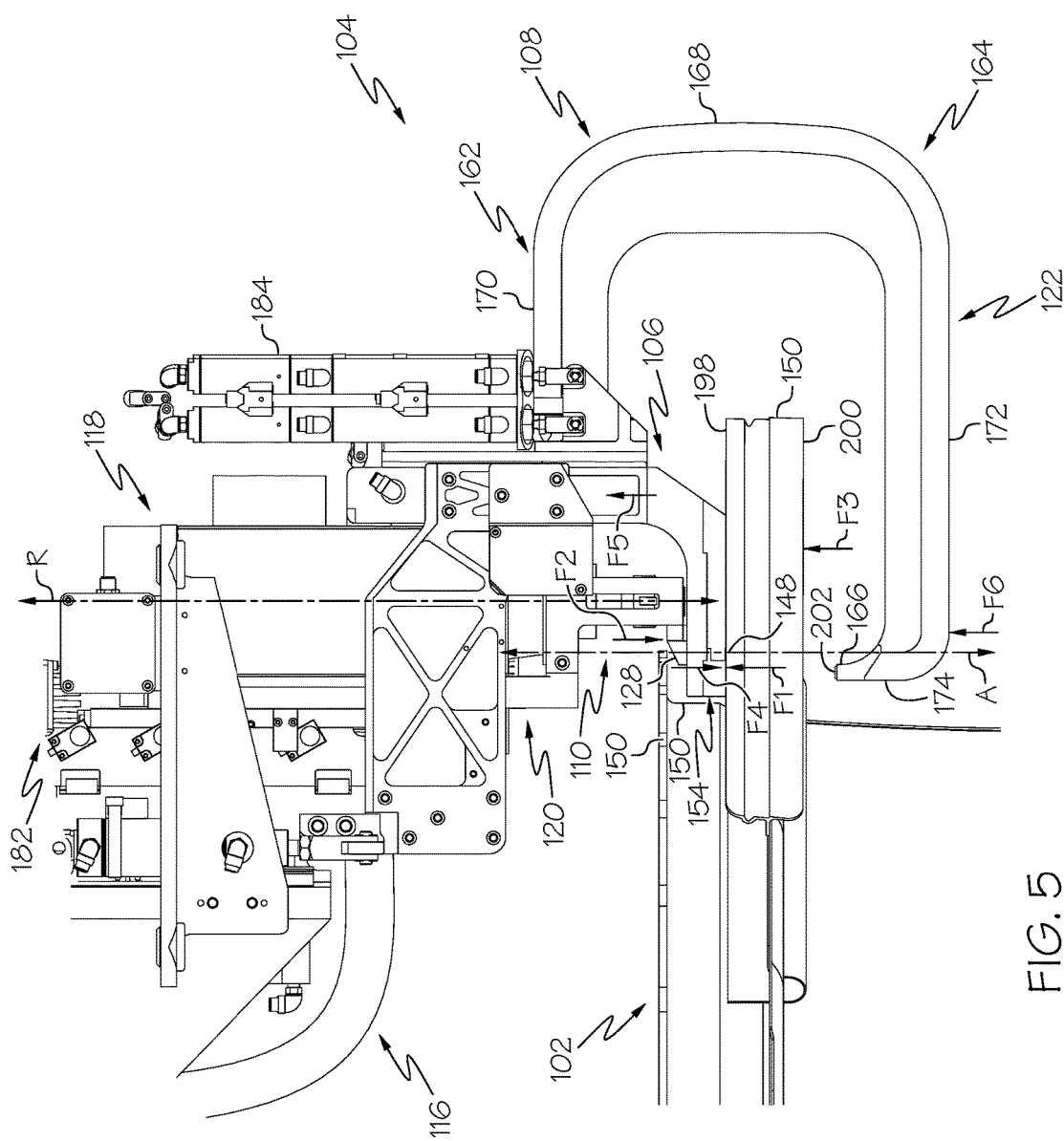
Figure 6:
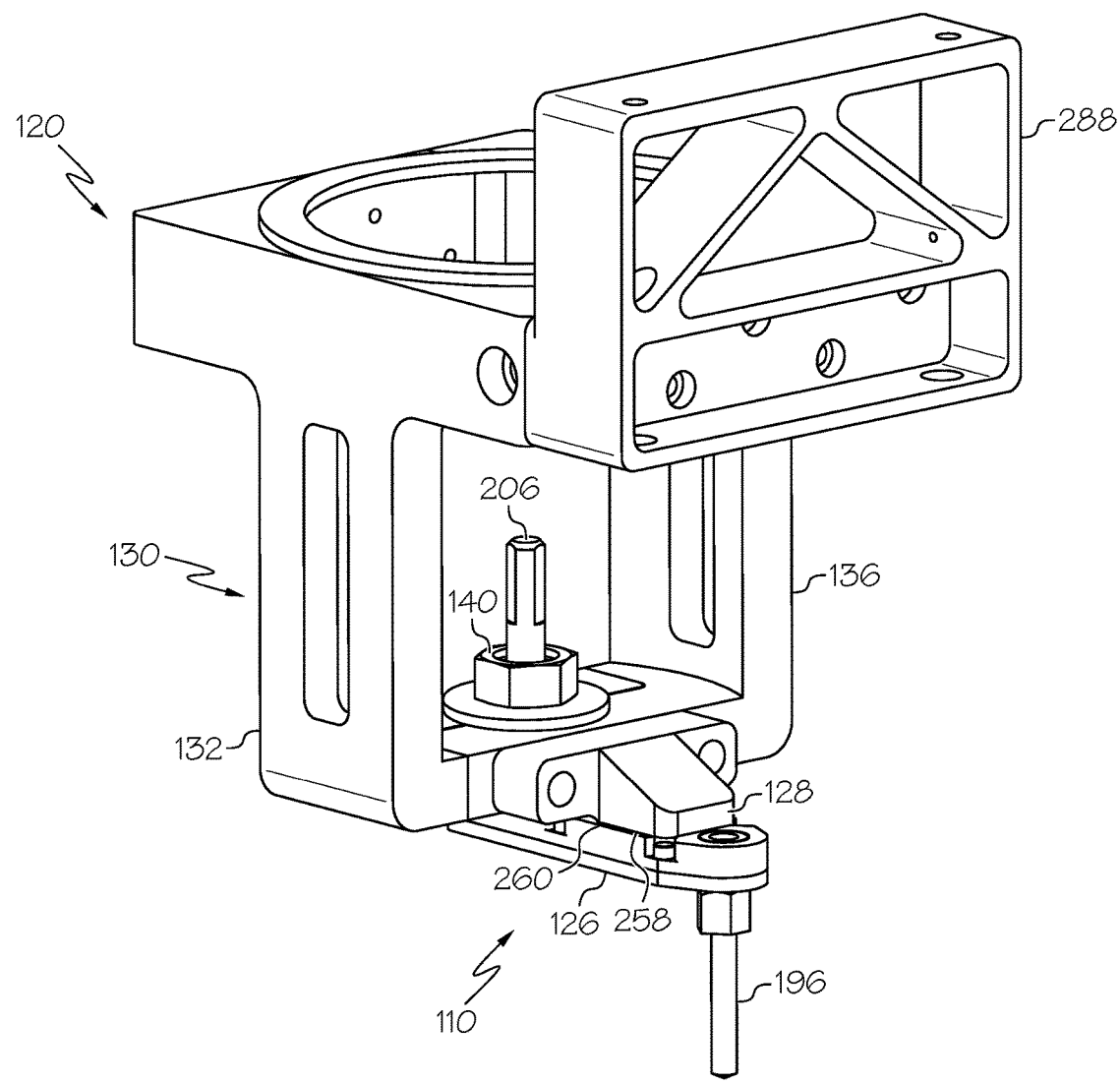
Figure 7:
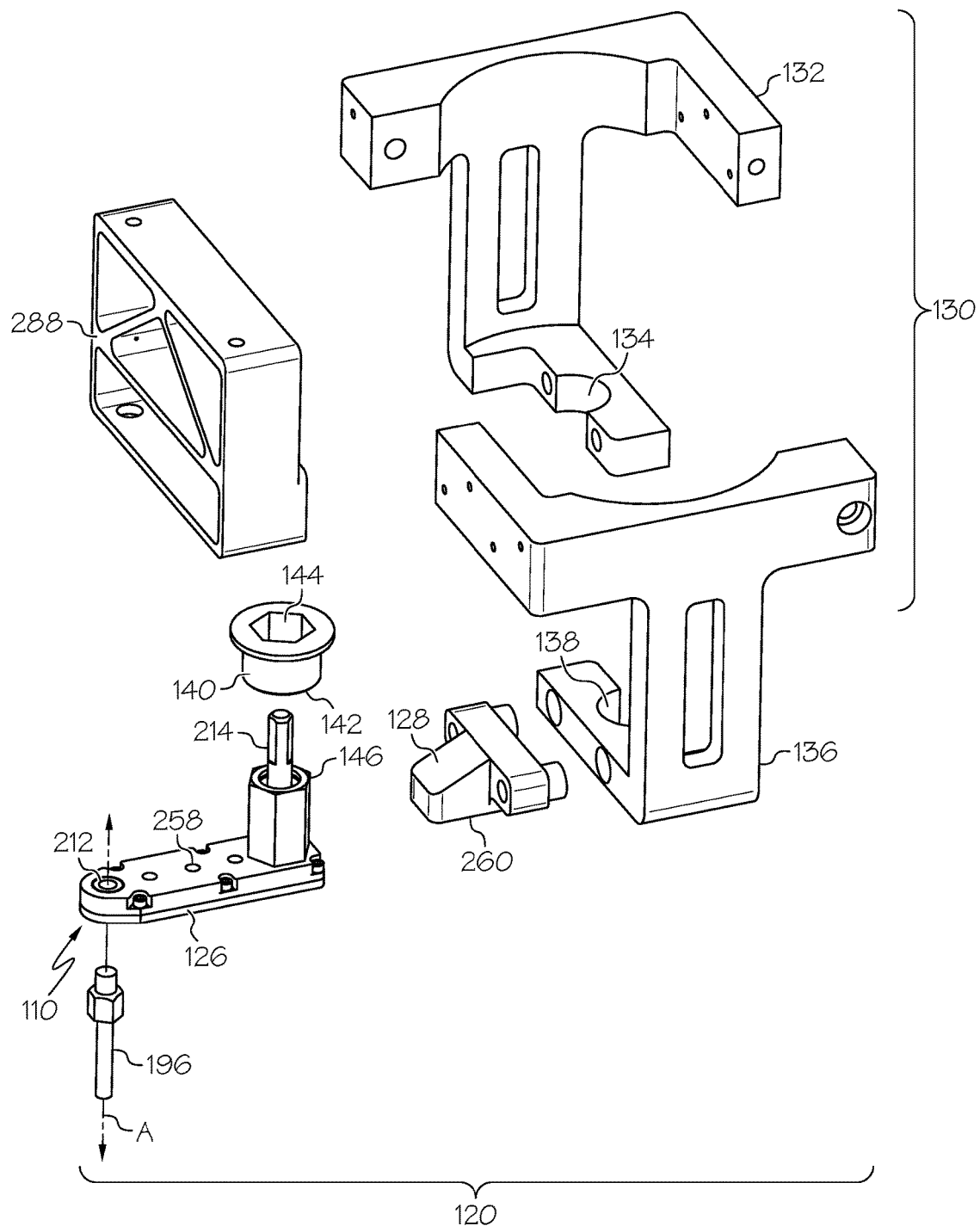
Figure 8:
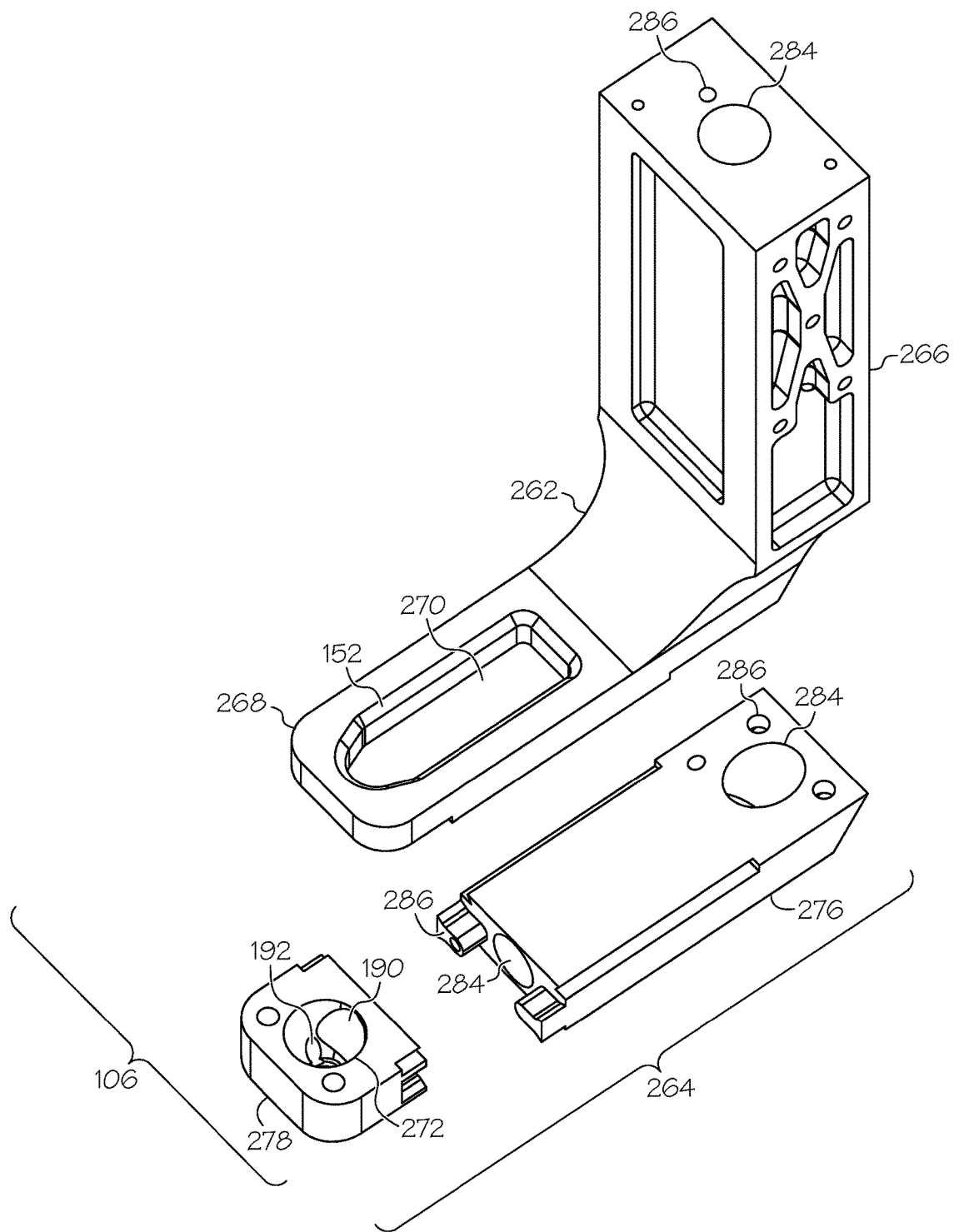
Figure 9:
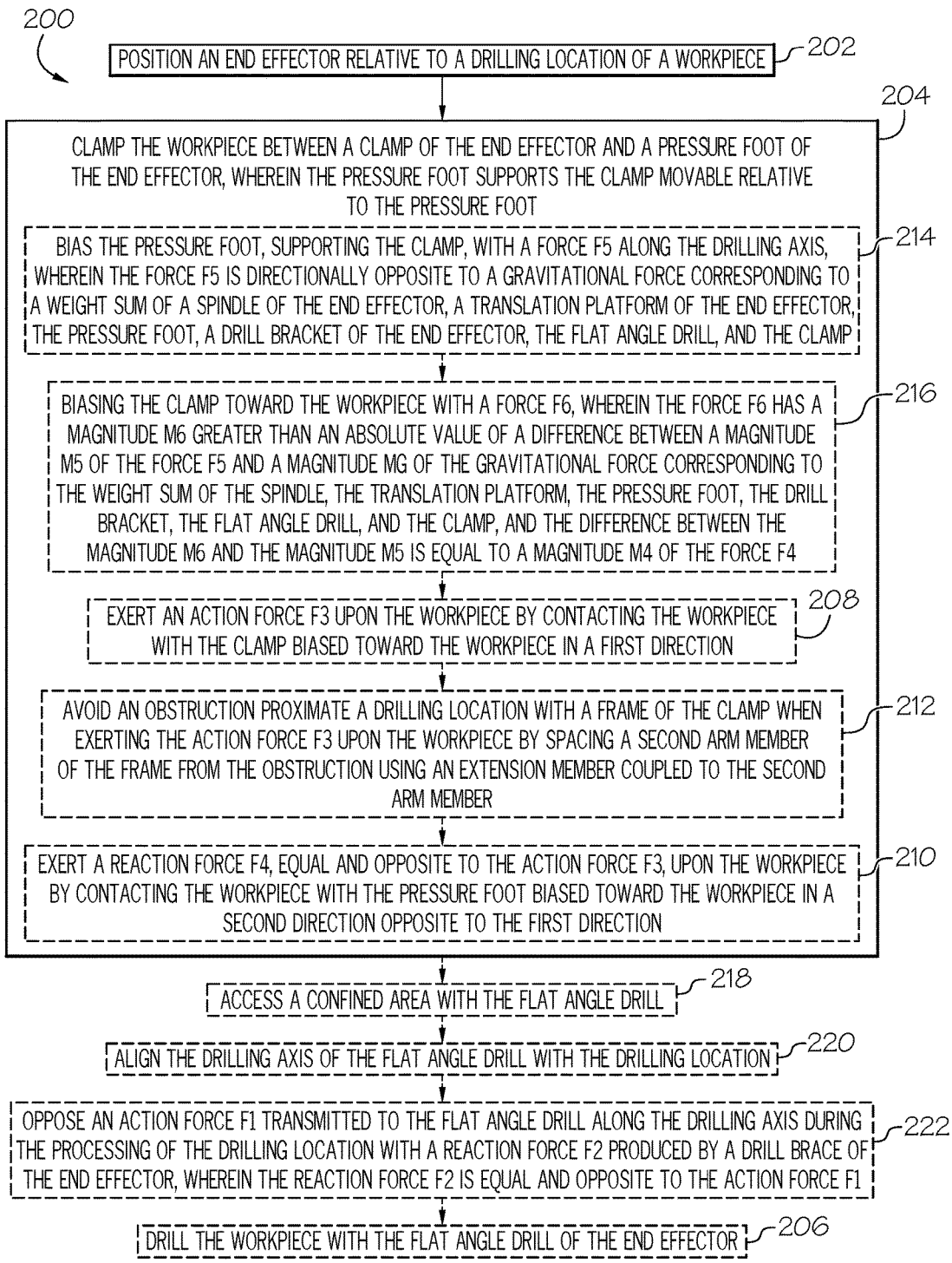
Figure 10:
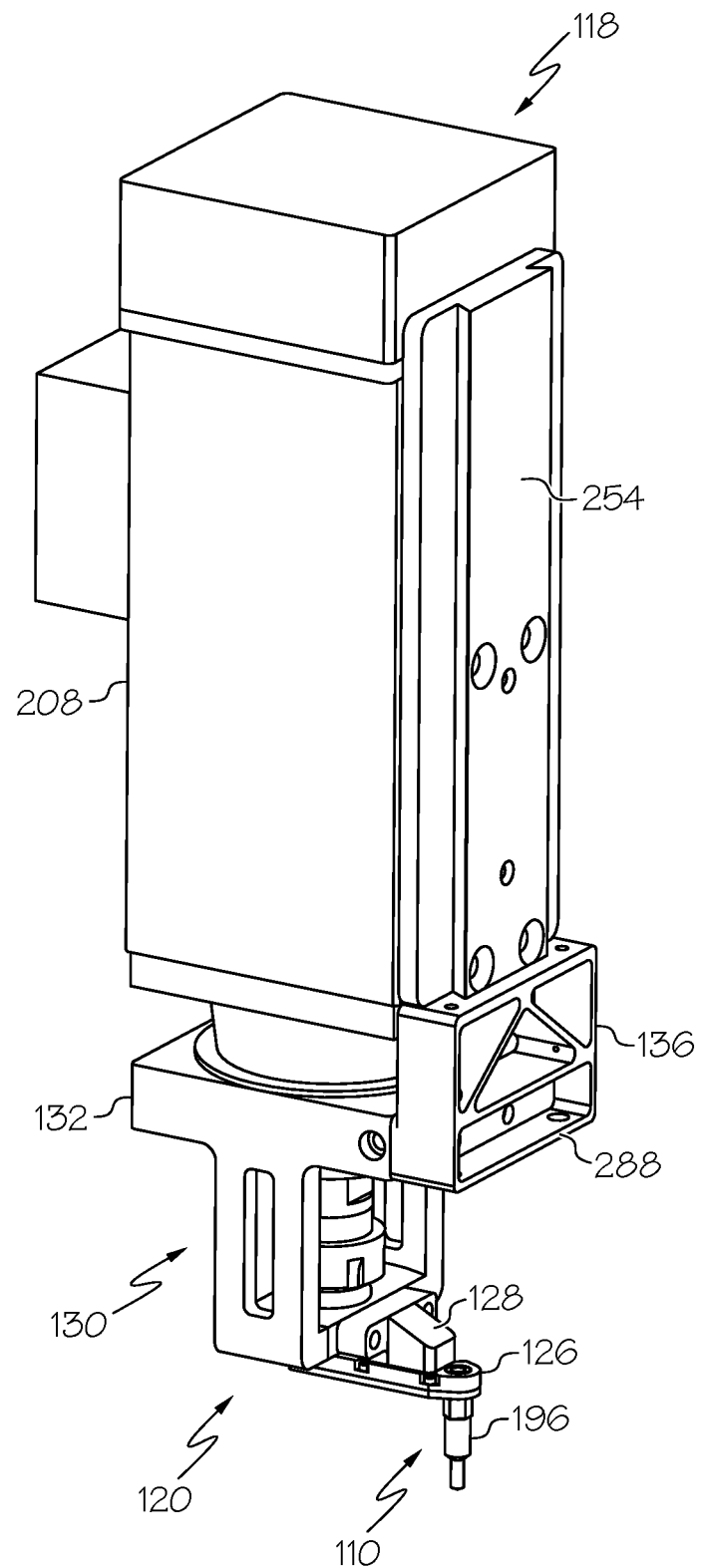
Figure 11:
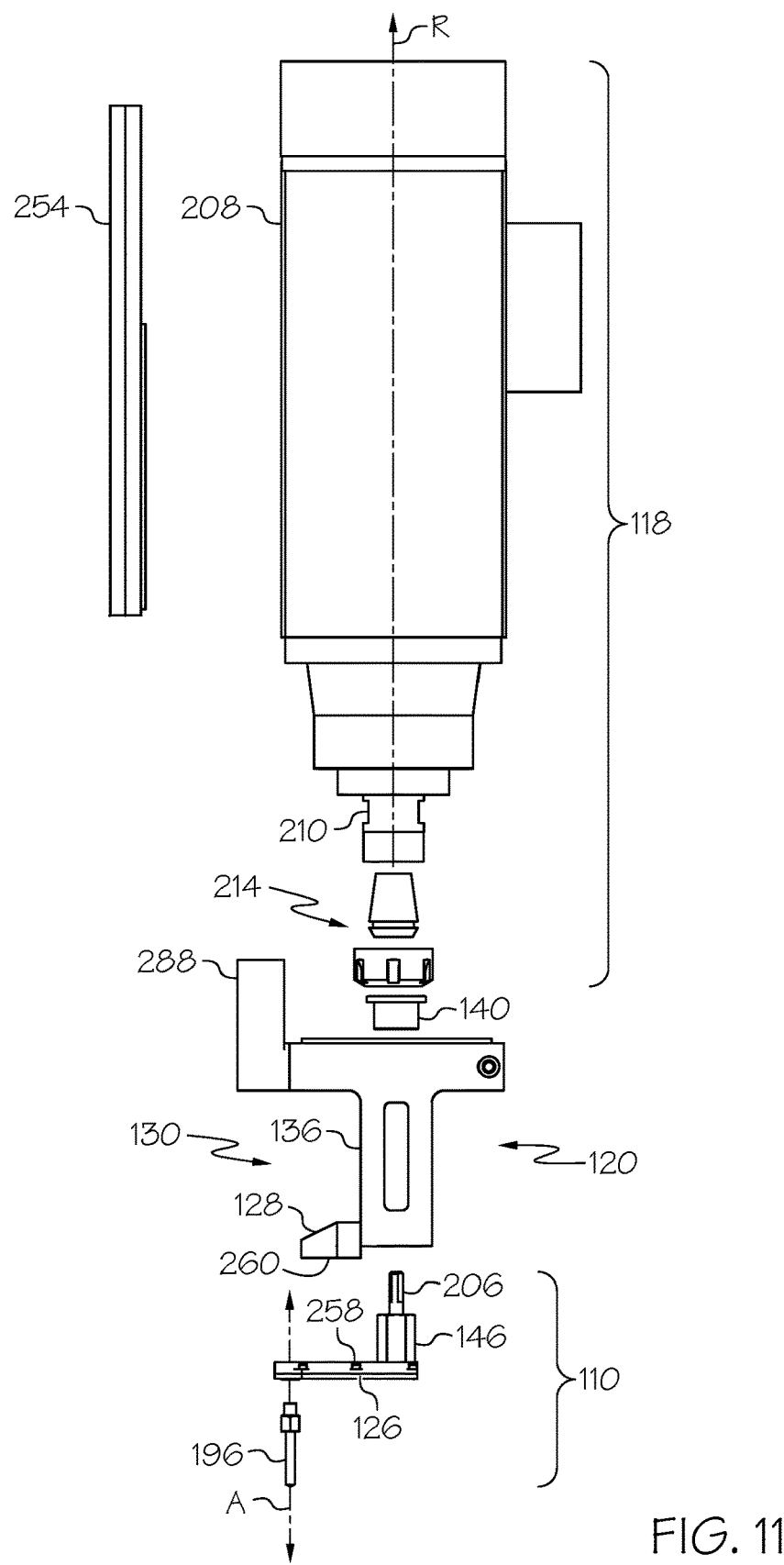
Figure 12:
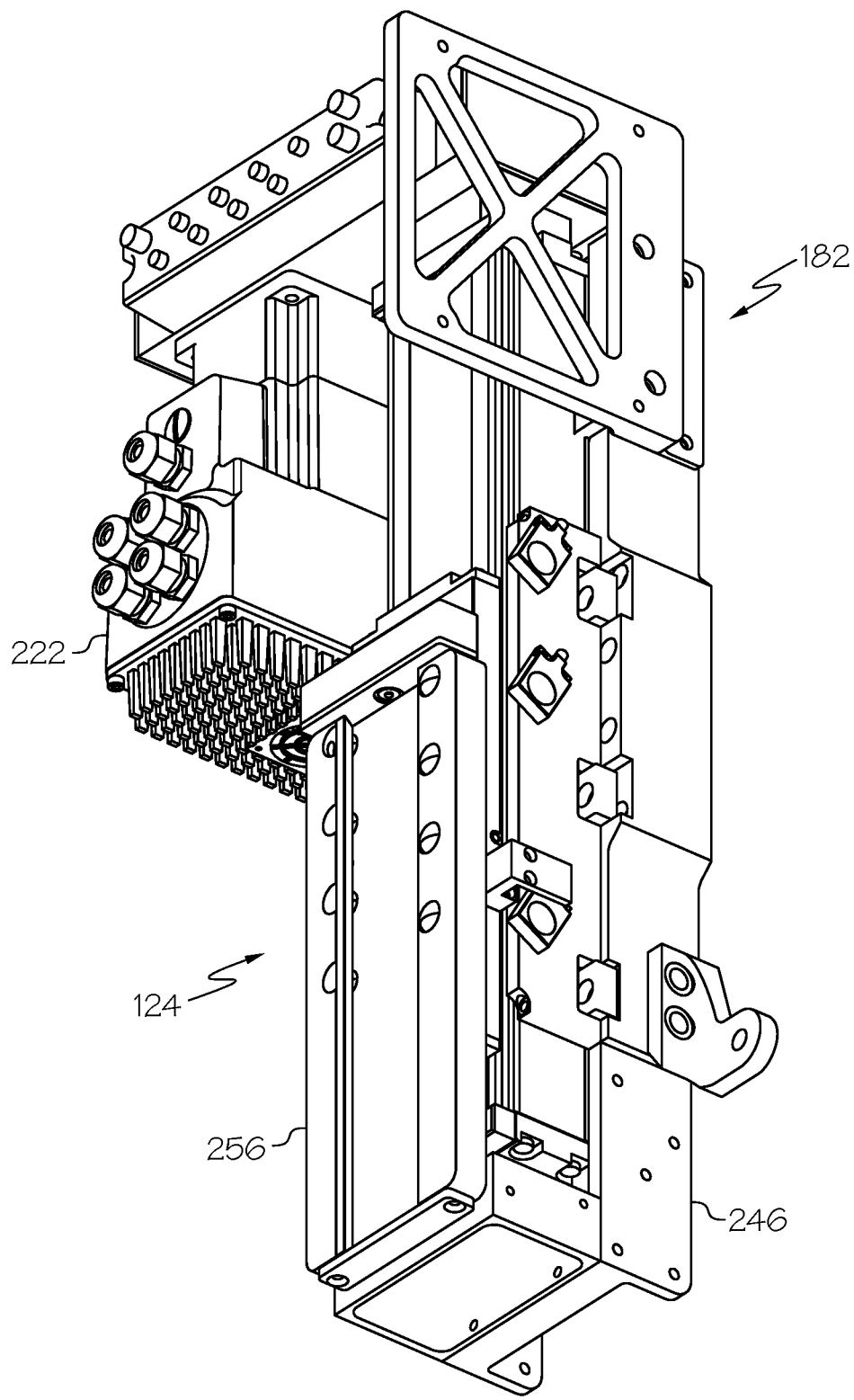
Figure 13:
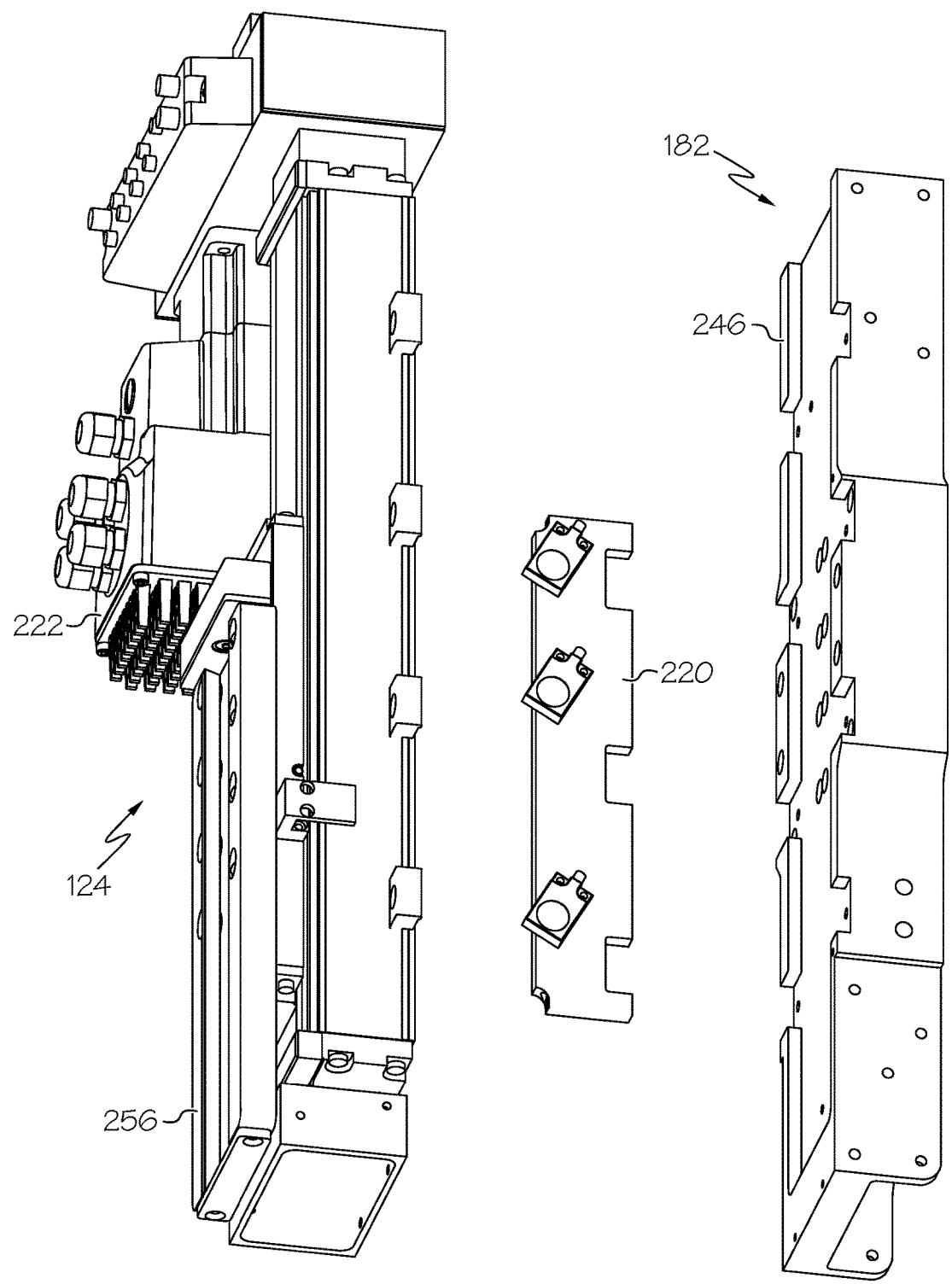
Figure 14:
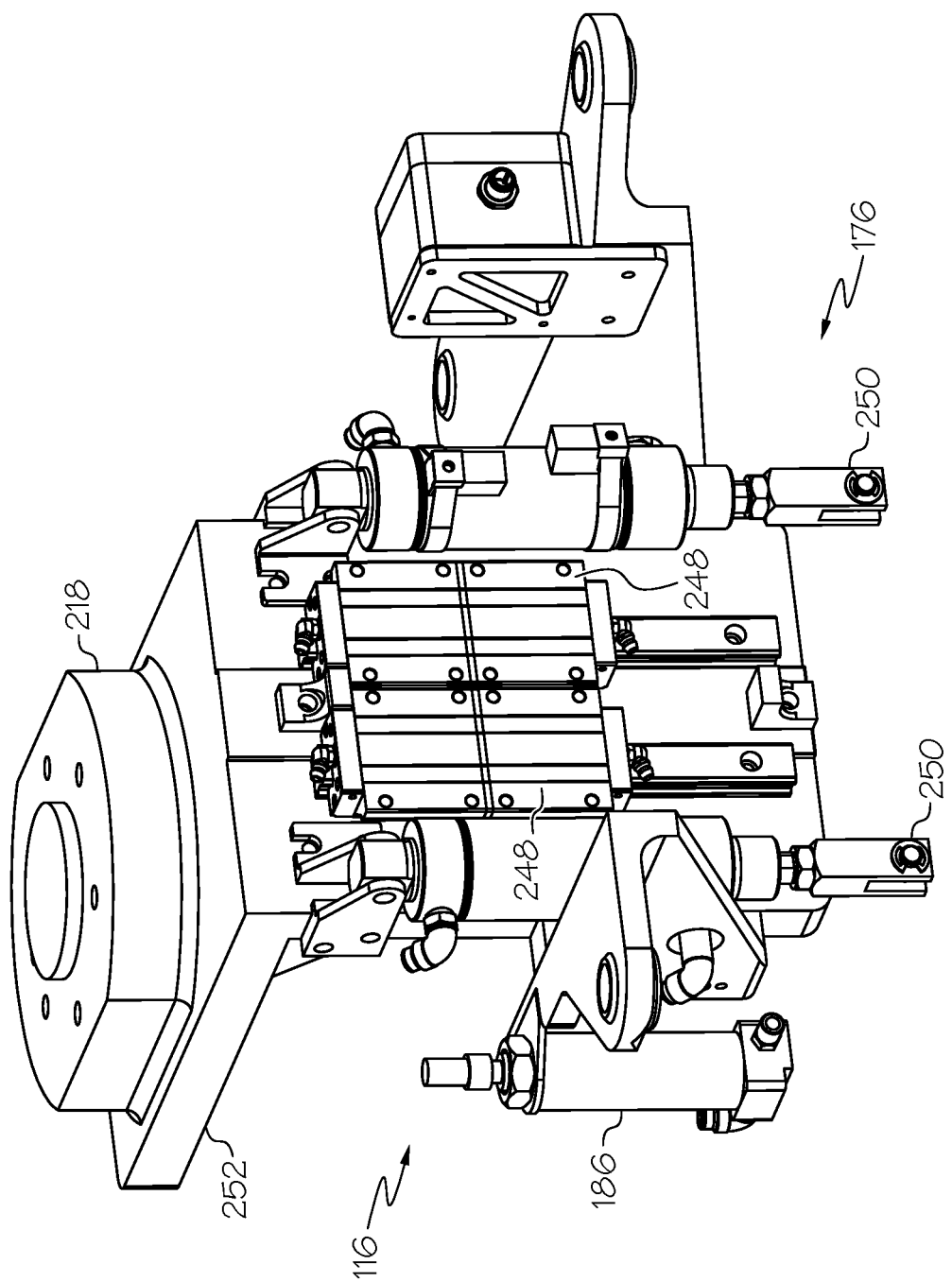
Figure 15:
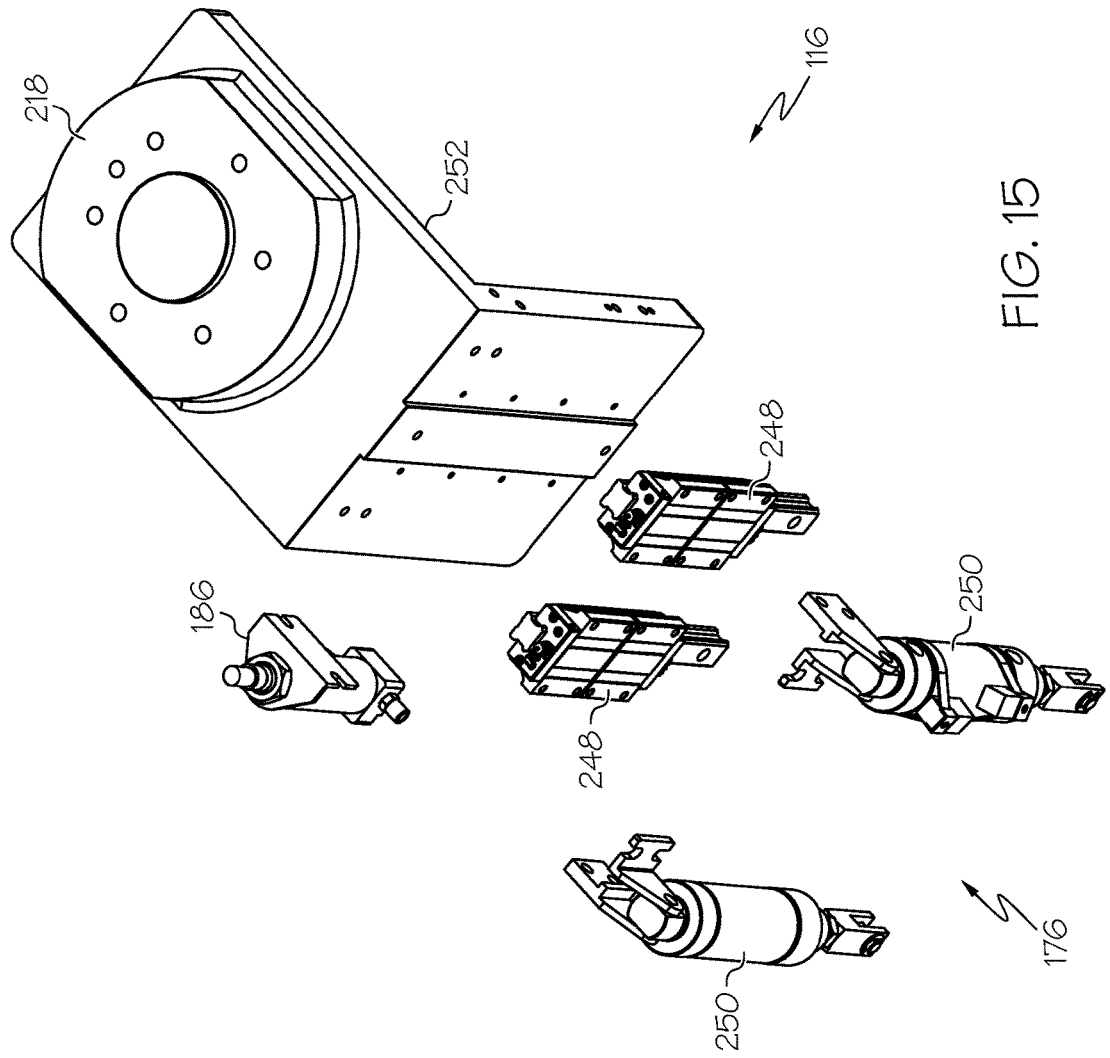
Figure 16:
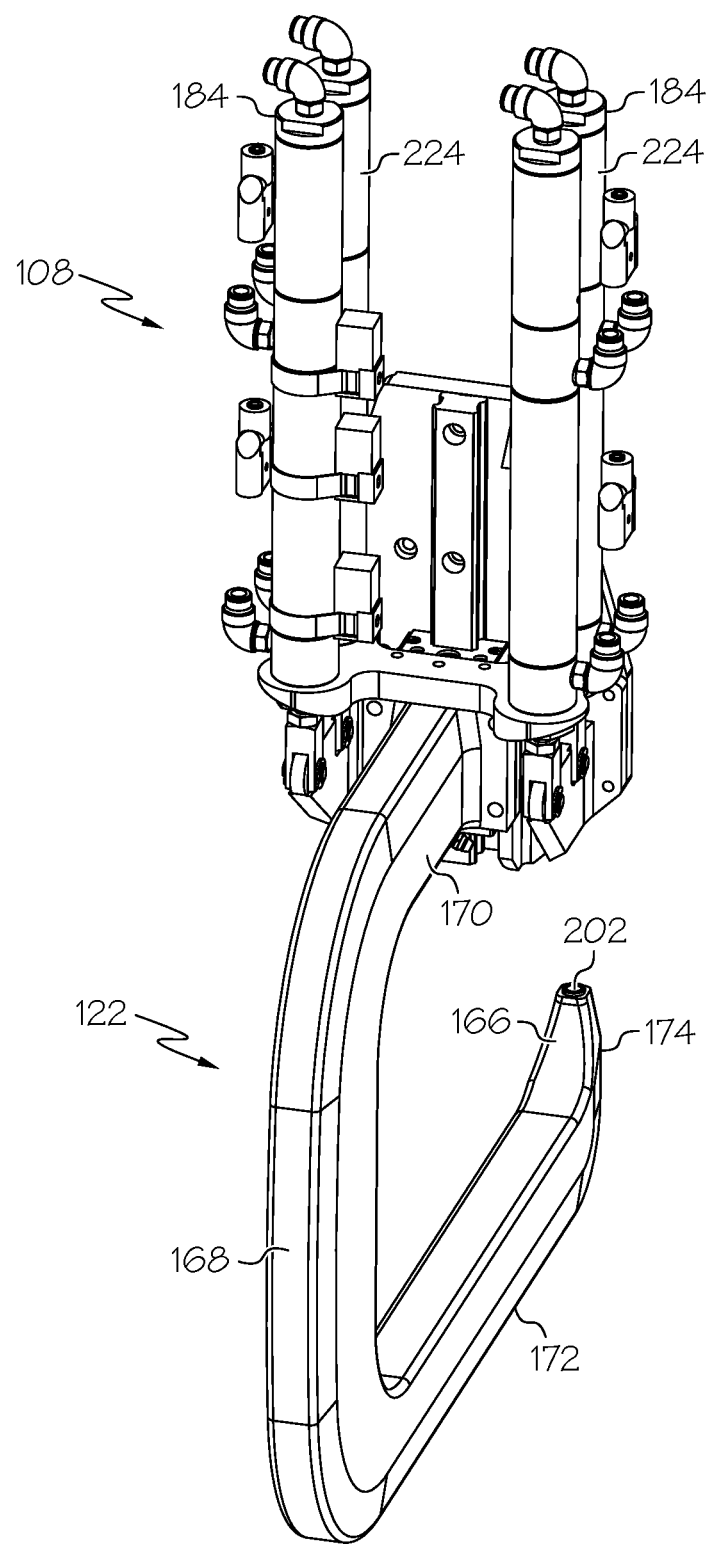
Figure 17:
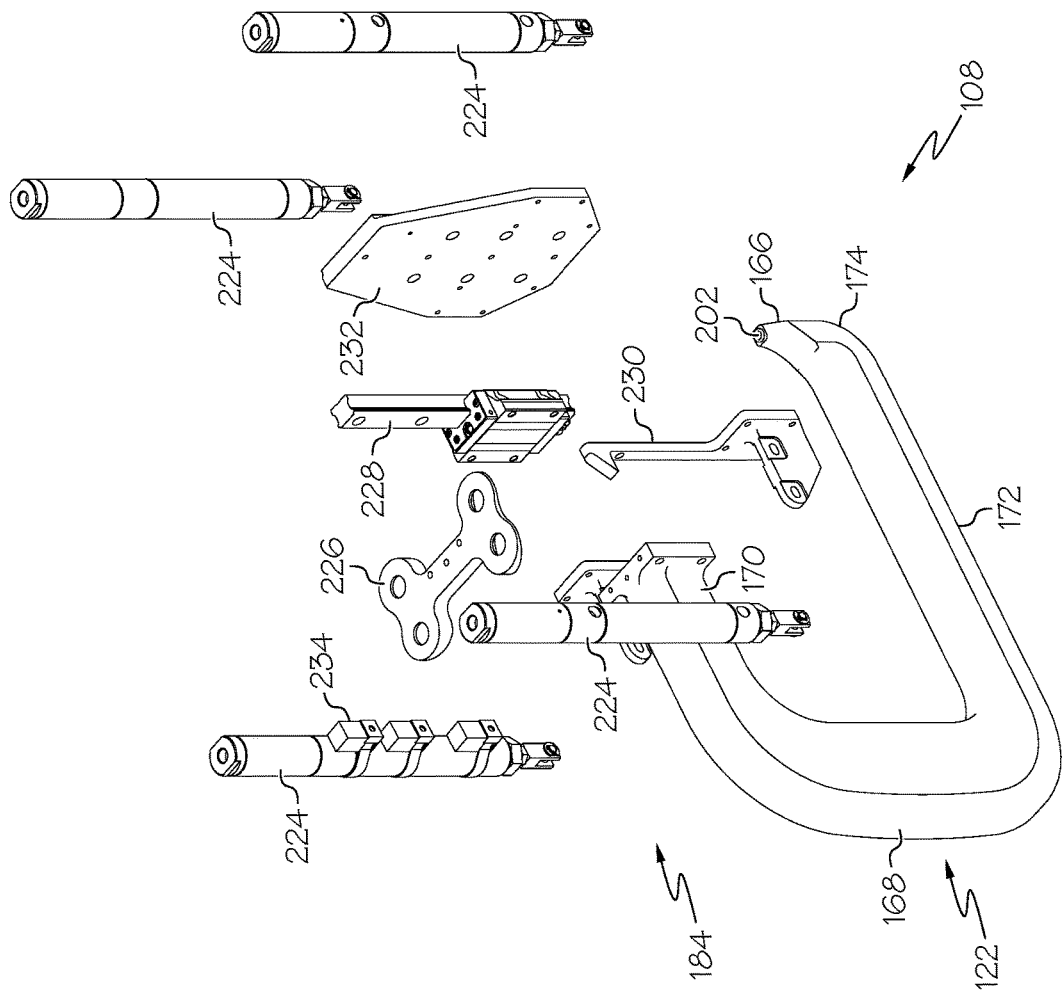
Figure 18:
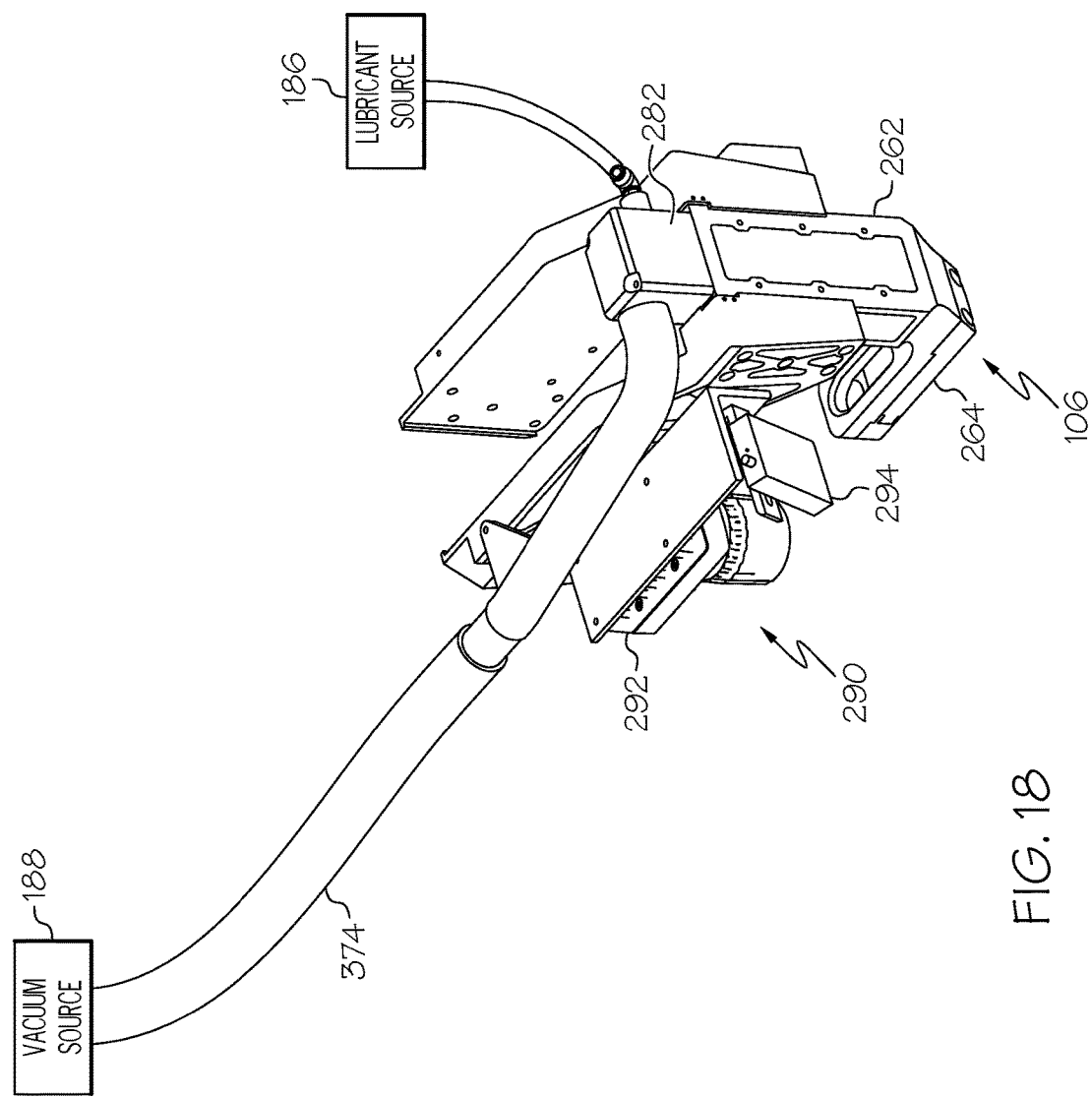
Figure 19:
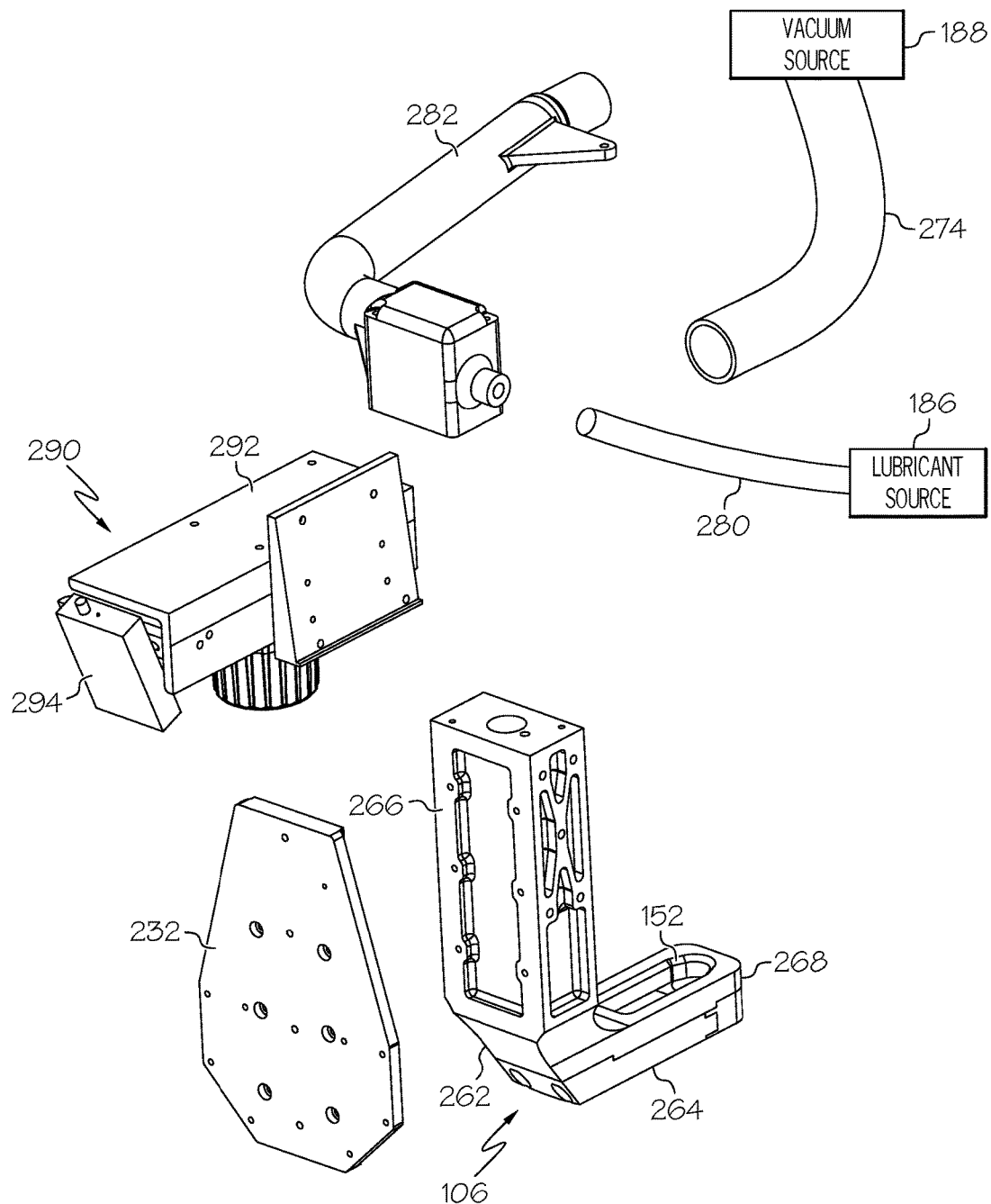
Figure 20:
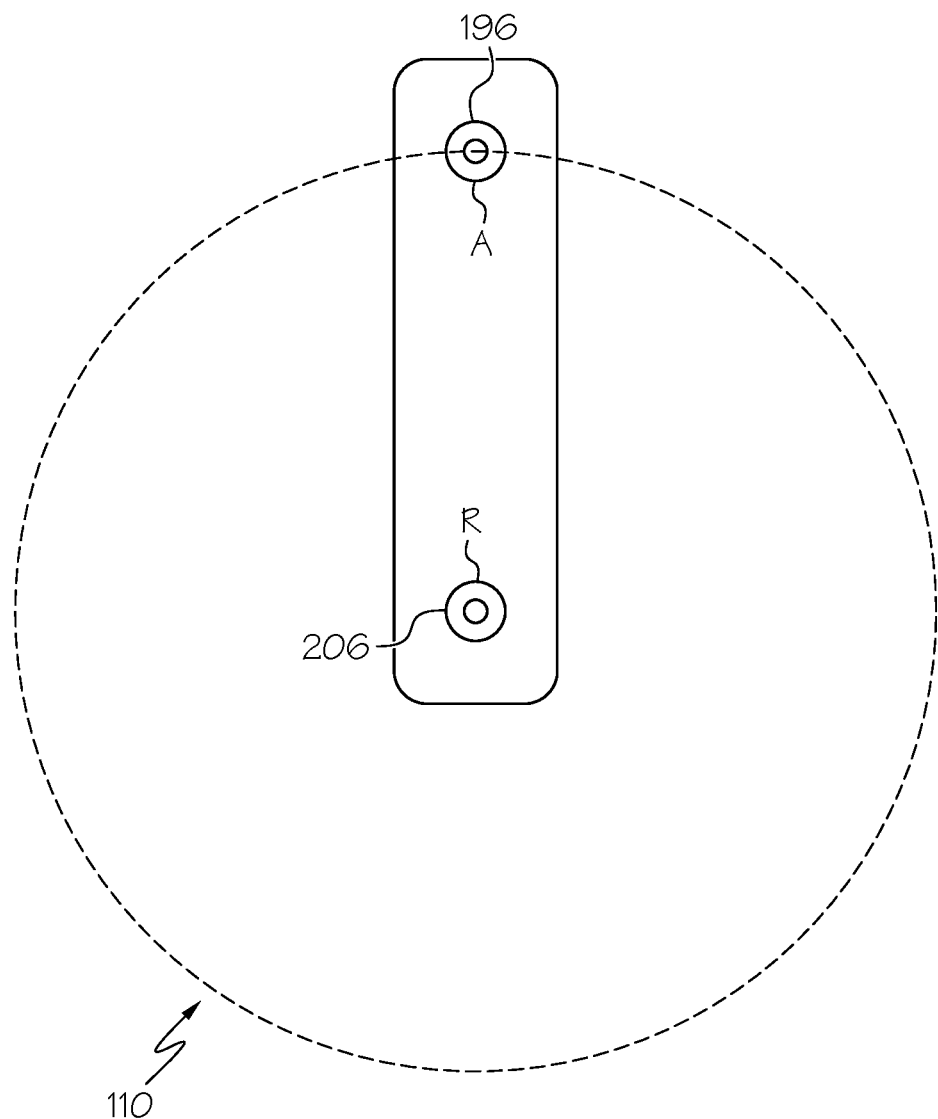
Figure 21:
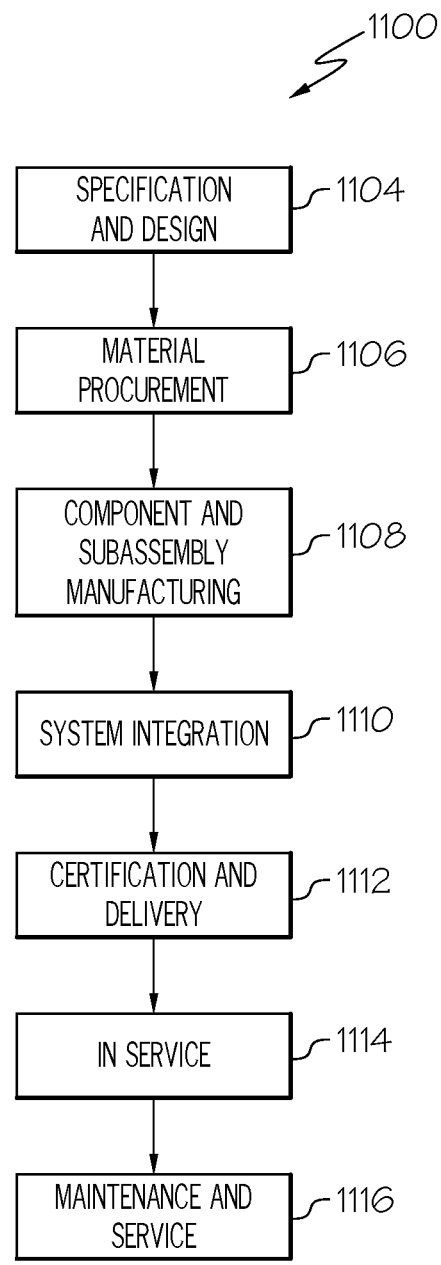
Figure 22:
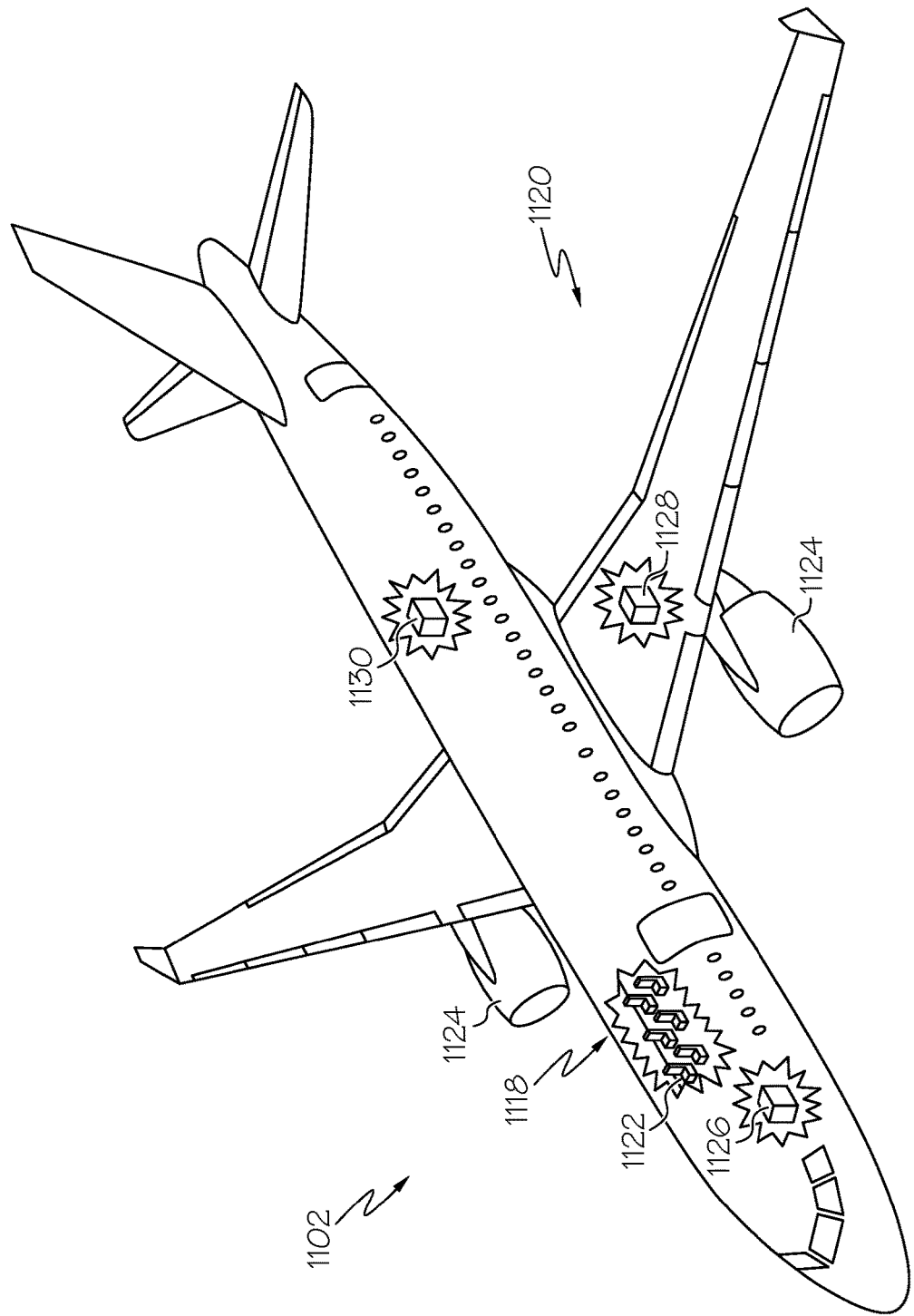

Having thus described examples of the present disclosure in general terms, reference will now be made to the accompanying drawings, which are not necessarily drawn to scale, and wherein like reference characters designate the same or similar parts throughout the several views, and wherein:

FIGS. 1A and 1B, collectively, are a block diagram of an apparatus for processing a confined area of a workpiece;

FIG. 2 is a schematic perspective view of the apparatus and the workpiece of FIG. 1, according to one or more examples of the present disclosure;

FIG. 3 is a schematic side elevational view of an end effector of the apparatus of FIG. 1, according to one or more examples of the present disclosure;

FIG. 4 is a schematic exploded side elevational view of the end effector of FIG. 3, according to one or more examples of the present disclosure;

FIG. 5 is a schematic illustration of an end effector of the apparatus of FIG. 1, according to one or more examples of the present disclosure;

FIG. 6 is a schematic perspective view of a drill bracket of the apparatus of FIG. 1, according to one or more examples of the present disclosure;

FIG. 7 is a schematic exploded perspective view of the drill bracket of FIG. 6, according to one or more examples of the present disclosure;

FIG. 8 is schematic exploded perspective view of a pressure foot of the apparatus of FIG. 1, according to one or more examples of the present disclosure;

FIG. 9 is a block diagram of a method for processing a confined area of a workpiece, according to one or more examples of the present disclosure;

FIG. 10 is a schematic perspective view of a spindle, a drill bracket, and a flat angle drill of the apparatus of FIG. 1, according to one or more examples of the present disclosure;

FIG. 11 is a schematic exploded side view of the spindle, the drill bracket, and the flat angle drill of FIG. 10, according to one or more examples of the present disclosure;

FIG. 12 is schematic perspective view of a translation platform and a spindle drive mechanism of the apparatus of FIG. 1, according to one or more examples of the present disclosure;

FIG. 13 is a schematic exploded perspective view of the translation platform and the spindle drive mechanism of FIG. 12, according to one or more examples of the present disclosure;

FIG. 14 is schematic perspective view of a base and a counterbalance of the apparatus of FIG. 1, according to one or more examples of the present disclosure;

FIG. 15 is a schematic exploded perspective view of the base and the counterbalance of FIG. 14, according to one or more examples of the present disclosure;

FIG. 16 is schematic perspective view of a clamp of the apparatus of FIG. 1, according to one or more examples of the present disclosure;

FIG. 17 is a schematic exploded perspective view of the clamp of FIG. 16, according to one or more examples of the present disclosure;

FIG. 18 is a schematic perspective view of a pressure foot, an imaging sensor, and a vacuum-lubricant attachment of the apparatus of FIG. 1, according to one or more examples of the present disclosure;

FIG. 19 is a schematic exploded perspective view of the pressure foot, the imaging sensor, and the vacuum-lubricant attachment of FIG. 18, according to one or more examples of the present disclosure;

FIG. 20 is a schematic illustration of a clocked orientation of a flat angle drill of the apparatus of FIG. 1, according to one or more examples of the present disclosure;

FIG. 21 is a block diagram of aircraft production and service methodology; and FIG. 22 is a schematic illustration of an aircraft.

DETAILED DESCRIPTION

In FIG. 1, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships between the various disclosed elements are necessarily represented. Accordingly, couplings other than those depicted in the block diagrams may also exist. Dashed lines, if any, connecting the various elements and/or components represent couplings similar in function and purpose to those represented by solid lines; however, couplings represented by the dashed lines may either be selectively provided or may relate to alternative or optional examples of the present disclosure. Likewise, elements and/or components, if any, represented with dashed lines, indicate alternative or optional examples of the present disclosure. Environmental elements, if any, are represented with dotted lines. Virtual imaginary elements may also be shown for clarity. Those skilled in the art will appreciate that some of the features illustrated in FIG. 1 may be combined in various ways without the need to include other features described in FIG. 1, other drawing figures, and/or the accompanying disclosure, even though such combination or combinations are not explicitly illustrated herein. Similarly, additional features not limited to the examples presented, may be combined with some or all of the features shown and described herein.

In FIG. 9, referred to above, the blocks may represent operations and/or portions thereof and lines connecting the various blocks do not imply any particular order or dependency of the operations or portions thereof. FIG. 9 and the accompanying disclosure describing the operations of the methods set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Reference herein to "one example" means that one or more feature, structure, or characteristic described in connection with the example is included in at least one implementation. The phrase "one example" in various places in the specification may or may not be referring to the same example.

Illustrative, non-exhaustive examples of the subject matter according the present disclosure, which may or may not be claimed, are provided below.

Referring e.g., to FIGS. 1-8, the instant paragraph pertains to example 1 of the present disclosure. Example 1 relates to apparatus 100 for processing workpiece 102 along drilling axis A. Apparatus 100 comprises end effector 104. End effector 104 comprises pressure foot 106, clamp 108 linearly movable relative to pressure foot 106 along drilling axis A, and flat angle drill 110 linearly movable relative to pressure foot 106 along drilling axis A.

Drilling axis A is an axis along which a drilling operation is performed on workpiece 102. As one general, non-limiting example, drilling axis A may be defined by an axis passing through flat angle drill 110 (e.g., drill bit 196 of flat angle drill 110) and workpiece 102 (e.g., surface of workpiece 102). As one specific, non-limiting example, drilling axis A may be defined by an axis passing through a center of drill bit 196 of flat angle drill 110 and normal to surface 198 of workpiece 102.

As used herein, "drilling operation" means any machining or cutting process that uses drill bit 196 to form (e.g., cut and/or enlarge) a hole of circular cross-section in solid materials. As one example, the drilling operation may include forming a fastening aperture (e.g., hole) in or through surface 198 or workpiece 102.

Those skilled in the art will recognize that apparatus 100 may also process workpiece 102 along one or more other axes that are different from drilling axis A. As one example, apparatus 100 may process workpiece 102 along an axis through which a milling operation is performed, for example, an axis that is substantially perpendicular to drilling axis A.

As used herein, "along drilling axis A" means motion in a direction coincident with or parallel to drilling axis A. As one example, clamp 108 being linearly movable relative to pressure foot 106 along drilling axis A may mean that clamp 108 is linearly movable relative to pressure foot 106 in a direction (or opposing directions) parallel to drilling axis A. As one example, flat angle drill 110 being linearly movable relative to pressure foot 106 along drilling axis A may mean that flat angle drill 110 is linearly movable relative to pressure foot 106 in a direction parallel to drilling axis A.

Referring generally to FIG. 1 and particularly to e.g. FIG. 2, workpiece 102 includes any object or article that is processed by apparatus 100. As one example, workpiece 102 may include a raw or partially finished component or part of an article of manufacture, such as a vehicle (e.g., an aircraft).

Referring generally to FIG. 1 and particularly to e.g. FIGS. 2 and 5, workpiece 102 may include one or more surfaces 198 to be processed by apparatus 100. Surface 198 may include drilling location 148. Drilling location 148 may include a point of contact between surface 198 and drill bit 196 (e.g., location of the hole to be formed in surface 198). Drilling location 148 may be located in confined area 154 of workpiece 102. Confined area 154 may be defined by surface 198 and one or more obstructions 150. Obstruction 150 may include another surface, feature, and/or structure of workpiece 102 proximate (e.g., at or near) drilling location 148. As one example, obstruction 150 may include a flange extending (e.g., perpendicularly) from surface 198 proximate drilling location 148 or extending toward drilling location 148. As one example, obstruction 150 may include another surface of workpiece 102 spaced away from and located over, below, or beside drilling location 148. As one example, obstruction 150 may include surface textures (e.g., reinforcing ribs) disposed on surface 200 of workpiece 102 opposite drilling location 148 (e.g., being opposite of surface 198 upon which drilling location 148 is located).

Referring generally to FIG. 1 and particularly to e.g. FIGS. 2 and 5, end effector 104 may be configured to position workpiece 102 between pressure foot 106 and clamp 108 prior to the drilling operation. End effector 104 may be configured to clamp workpiece 102 between pressure foot 106 and clamp 108, for example, avoiding obstruction 150, during a clamping operation. End effector 104 with flat angle drill 110 is configured to avoid obstruction 150 when being positioned relative to drilling location 148 (e.g., by aligning drilling axis A of flat angle drill 110 with drilling location 148) for performing a drilling operation on workpiece 102 (e.g., surface 198 of workpiece 102).

As used herein, "clamping operation" means applying a clamping force (e.g., a preload force) to workpiece 102. As one example, and as best illustrated in FIG. 5, the clamping operation may include contacting surface 200 of workpiece 102 with clamp 108 and applying (e.g., exerting) action force $F_3$ upon workpiece 102 by clamp 108 and contacting surface 198 of workpiece 102 with pressure foot 106 and applying (e.g., exerting) reaction force $F_4$ upon workpiece 102 by pressure foot 106. Reaction force $F_4$ being equal and opposite to action force $F_3$.

Referring generally to FIG. 1 and particularly to e.g. FIGS. 3-7 and 11, flat angle drill 110 may be capable of accessing drilling location 148 within confined area 154 when positioned, by end effector 104, with respect to drilling location 148. Flat angle drill 110 may also be known as a "porkchop". In one example construction, flat angle drill 110 may include housing 126, hexagonal retainer 146, drive shank 206, and drill bit receiver 212. Housing 126 may include internal transmission (not shown) capable of translating rotational motion of drive shank 206 to rotational motion of drill bit receiver 212 and, thus, rotation of drill bit 196. Housing 126 may space drill bit receiver 212 away from drive shank 206 (e.g., drill bit 198 may be offset relative to drive shank 206 and spindle 118). Hexagonal retainer 146 may be rigidly connected to housing 126. Drive shank 206 may be operatively coupled to housing 126 (e.g., to internal transmission). Drive shank 206 may extend through and be freely rotatable relative to (e.g., within) hexagonal retainer 146. Drill bit receiver 212 may be operatively coupled to housing 126 (e.g., to internal transmission) and capable of receiving drill bit 196 and securing drill bit 196 to housing 126. As one example, drill bit 198 may be threadingly connected to drill bit receiver 212. For example, drill bit receiver 212 may include internal threading and drill bit 196 may include external threading. The threading of drill bit 196 and drill bit receiver 212 may oppose a direction of rotation of drill bit 196 during the drilling operation (e.g., left-hand threading). As one specific, non-limiting example, flat angle drill 110 may be commercially available from Jiffy Air Tool, 2254 Conestoga Drive, Carson City, Nev. 89706.

Referring generally to FIG. 1 and particularly to e.g. FIGS. 3, 4, 6 and 7, the instant paragraph pertains to example 2 of the present disclosure. In example 2, which includes the subject matter of example 1, end effector 104 further comprises base 116, spindle 118 linearly movable relative to base 116 along drilling axis A, and drill bracket 120 fixed relative to spindle 118 and configured to retain flat angle drill 110 in a clocked orientation relative to drill bracket 120 and to brace flat angle drill 110 along drilling axis A. Flat angle drill 110 is configured to be operatively coupled to spindle 118.

As used herein, "clocked orientation" means a rotational (e.g., angular) position of flat angle drill 110 relative to spindle 118 and drill bracket 120. As one example, spindle 118 may include rotational axis R (FIGS. 4, 11 and 20). The clocked orientation of the flat angle drill 110 may be the rotational (e.g., angular) position of the flat angle drill 110 about rotational axis R relative to spindle 118 and/or drill bracket 120. As one example, and as best illustrated in FIG. 20, the clocked orientation may be defined by the rotational position of drilling axis A (e.g., passing through drill bit 196 and housing 126 of flat angle drill 110) relative to a fixed position of rotational axis R (e.g., passing through drill shank 206 of flat angle drill 110, drill bracket 120 and spindle 118). In the example illustrated in FIG. 20, drilling axis A may have a rotational position of zero degrees relative to rotational axis R.

Referring generally to FIG. 1 and particularly to e.g. FIGS. 3-5, 10 and 11, in one example construction, spindle 118 may include motor (e.g., motor housing) 208 and drive shaft 210 operably coupled to motor 208. Motor 208 may include any electric motor capable of providing rotational speeds of drive shaft 210 suitable for the drilling operation.

Referring generally to FIG. 1 and particularly to e.g. FIGS. 3-7, 10 and 11, drive shank 210 of flat angle drill 110 may be operatively coupled to drive shaft 210 of spindle 118. In one example construction, drive shaft 210 may include a drive shank clamp 214 capable of attaching flat angle drill 110 to spindle 118 (e.g., holding and securing drive shank 206 to drive shaft 210). As one example, and as illustrated in FIG. 11, drive shank clamp 214 may include a collet and a collet nut capable of forming a collar around drive shank 206 to secure drive shank 206 to drive shaft 210. As one example, drive shank clamp 214 may include a chuck to secure drive shank 206 to drive shaft 210.

Drill bracket 120 may engage hexagonal retainer 146 to retain flat angle drill 110 in the clocked orientation relative to drill bracket 120 and prevent rotation of flat angle drill 110 (e.g., housing 126) relative to drill bracket 120. Drill bracket 120 may also engage housing 126 to react to any torque applied to flat angle drill 110 during the drilling operation. As one example, and as best illustrated in FIG. 5, drill bracket 120 may generate reaction force $F_2$ equal and opposite to action force $F_1$ (e.g., torque) transmitted to the flat angle drill 110 (e.g., housing 126) along the drilling axis A during the drilling operation.

Referring generally to FIG. 1 and particularly to e.g. FIGS. 3-5 and 8, the instant paragraph pertains to example 3 of the present disclosure. In example 3, which includes the subject matter of example 2, end effector 104 further comprises translation platform 182 linearly movable relative to base 116 along drilling axis A. Spindle 118 is linearly movable relative to translation platform 182 along drilling axis A. Pressure foot 106 is fixed relative to translation platform 182.

Referring generally to FIG. 1 and particularly to e.g. FIGS. 3, 4 and 12-15, in one example construction, translation platform 182 may be operably coupled to base 116. As one example, translation platform 182 may be movably connected to base 116 such that translation platform 182 is linearly movable relative to base 116 along drilling axis A. As one example, translation platform 182 may include rail 246 (FIGS. 12 and 13). Rail 246 may be connected to rail and carriage bracket 248 of (e.g., connected to) base 116. Rail and carriage bracket 248 (FIG. 15) may be capable of supporting translation platform 182 (e.g., rail 246) and restraining linear motion of translation platform 182 to only along drilling axis A relative to base 116.

Referring generally to FIG. 1 and particularly to e.g. FIGS. 3 and 4, in one example construction, spindle 118 may be operatively coupled to translation platform 182. As one example, spindle 118 may be movably connected to transition platform 182 such that spindle 118 is linearly movable relative to translation platform 182 along drilling axis A.

Referring generally to FIG. 1 and particularly to e.g. FIGS. 3 and 4, in one example construction, drill bracket 120 may be fixedly coupled to spindle 118. As one example, drill bracket 120 may be connected to and supported by spindle 118 at a fixed position relative to spindle 118.

Referring generally to FIG. 1 and particularly to e.g. FIGS. 3 and 4, in one example construction, pressure foot 106 may be fixedly coupled to translation platform 182. As one example, pressure foot 106 may be connected to and supported by translation platform 182 at a fixed position relative to translation platform 182.

Referring generally to FIG. 1 and particularly to e.g. FIGS. 3 and 4, in one example construction, clamp 108 may be operatively coupled to pressure foot 106. As one example, clamp 108 may be movably connected to pressure foot 106 such that clamp 108 is linearly movable relative to pressure foot 106.

Referring generally to FIG. 1 and particularly to e.g. FIGS. 3, 4, and 6, in one example construction, flat angle drill 110 may be fixedly coupled to drill bracket 120 and operatively coupled to spindle 118. As one example, flat angle drill 100 may be operatively connected to and supported by spindle 118 at a fixed position relative to spindle 118 and drill bracket 120. Flat angle drill 110 may also be connected to and retained by drill bracket 120 at the clocked orientation relative to drill bracket 120.

Thus, linear movement of translation platform 182 relative to base 116 may linearly move and position spindle 118, pressure foot 106, drill bracket 120, flat angle drill 110, and clamp 108 along drilling axis A. Linear movement of spindle 118 relative to translation platform 182 may move and position spindle 118, drill bracket 120, and flat angle drill 110 along drilling axis A. Linear movement of clamp 108 relative to pressure foot 106 may move and position clamp 108 along drilling axis A.

Referring generally to FIG. 1 and particularly to e.g. FIGS. 3-5, the instant paragraph pertains to example 4 of the present disclosure. In example 4, which includes the subject matter of example 3, end effector 104 further comprises spindle drive mechanism 124 to linearly translate spindle 118 relative to translation platform 182 along drilling axis A, and clamp drive mechanism 184 to linearly translate clamp 108 relative to pressure foot 106 along drilling axis A.

Referring generally to FIG. 1 and particularly to e.g. FIGS. 3, 4, and 10-13, spindle drive mechanism 124 may include any linear drive mechanism or linear actuator 222 suitable to or capable of linearly moving spindle 118 relative to translation platform 182 along drilling axis A. As one general, non-limiting example, spindle drive mechanism 124 (e.g., linear actuator 222) may include a ball-screw drive 222. As one specific, non-limiting example, spindle drive mechanism 124 may include a ball-screw servo drive linear actuator. Other types of linear actuators are also contemplated without limitation. Spindle drive mechanism 124 may include a sensor 220 (FIG. 13) capable of monitoring a linear position of spindle 118 relative to translation platform 182 along drilling axis A.

In one example construction, and as best shown in FIGS. 12 and 13, spindle drive mechanism 124 may be fixedly coupled to translation platform 182 and operatively coupled to spindle 118. As one example, spindle drive mechanism 124 may be affixed or otherwise mechanically connected to rail 246 of translation platform 182, for example, via fasteners or hardware and operatively connected to spindle 118. In one example construction, spindle 118 may include spindle mounting plate 254 (FIGS. 10 and 11). Spindle drive mechanism 124 may include spindle drive mechanism mounting plate 256 (FIGS. 12 and 13). Spindle mounting plate 254 may be fixedly connected to spindle drive mounting plate 258. As one example, spindle mounting plate 254 may have a male projection (e.g., a dovetail projection). Spindle drive mechanism mounting plate 256 may include a corresponding female recess or channel (e.g., a dovetail recess) capable of slidably receiving the male projection of spindle mounting plate 254. Once connected and positioned, spindle mounting plate 254 and spindle drive mechanism mounting plate 256 may be fastened together to fix spindle 118 relative to spindle drive mechanism 124. Spindle drive mechanism mounting plate 256 may be connected to linear actuator 222, such that linear actuator 222 moves spindle drive mechanism mounting plate 256 along drilling axis A relative to translation platform 182. Linear motion along drilling axis A of spindle drive mechanism mounting plate 256 may be transferred to linear motion of spindle mounting plate 254 along drilling axis A and, thus, to spindle 118 relative to translation platform 182 (e.g., rail 246).

Referring generally to FIG. 1 and particularly to e.g. FIGS. 3, 4, 16 and 17, clamp drive mechanism 184 may include any linear drive mechanism or linear actuator 224 suitable to or capable of linearly moving clamp 108 relative to pressure foot 106 along drilling axis A. Clamp drive mechanism 184 may include a length of travel suitable to allow frame 122 of clamp 108 to avoid (e.g., clear) obstruction 150. As one general, non-limiting example, clamp drive mechanism 184 (e.g., linear actuator 224) may include one or more pneumatic actuators (e.g., cylinders). In the example construction illustrated in FIGS. 3, 4, 16, and 17, clamp drive mechanism 184 includes four pneumatic actuators. As one specific, non-limiting example, clamp drive mechanism 184 may include a plurality of three-position pneumatic actuators, such as those commercially available from Bimba Manufacturing, 25150 S. Governors Hwy, University Park, Ill. 60484. Three-position pneumatic actuators may be advantageous because such pneumatic actuators include a center position in addition to an open position and a closed position and two pistons (e.g., instead of just one piston). Thus, three-position pneumatic actuators may include a maximum (e.g., full) extension and an intermediate stopping point. Clamp drive mechanism 184 may include one or more sensors 234 (FIG. 17) capable of monitoring a linear position of clamp 108 (e.g., frame 122) relative to pressure foot 106 along drilling axis A. As a specific, non-limiting example, sensors 234 may include magnetic reed switch sensors.

Referring generally to FIG. 1 and particularly to e.g. FIGS. 3, 4, 16-19, in one example construction, frame 122 may be connected to clamp drive mechanism 184. As one example, clamp 108 may include an actuator mounting bracket 226 to connect frame 122 to linear actuators 224. In one example construction, clamp 108 may include connected to pressure foot 106. As one example, clamp 108 may include clamp mounting bracket 232. Clamp drive mechanism 184 (e.g., linear actuators 224) may be connected to clamp mounting bracket 232. Clamp mounting bracket 232 may be connected to pressure foot 106, as best illustrated in FIG. 19. In one example construction, clamp 108 may include rail and carriage bracket 228 capable of supporting clamp 108 and restraining linear motion of clamp 108 to only along drilling axis A relative to pressure foot 106. As one example, frame 122 may be connected to rail and carriage bracket 228 and rail and carriage bracket 228 may be connected to clamp mounting plate 232 (e.g., to pressure foot 106) to support linear motion of frame 122 relative to pressure foot 106 along drilling axis A when moved along drilling axis A by clamp drive mechanism 184 (e.g., linear actuators 224).

Referring generally to FIG. 1 and particularly to e.g. FIGS. 3-5, the instant paragraph pertains to example 5 of the present disclosure. In example 5, which includes the subject matter of any of examples 3-4, end effector 104 further comprises counterbalance 176 capable of biasing pressure foot 106 with force $F_5$ along drilling axis A. Force $F_5$ is directionally opposite to a gravitational force corresponding to a weight sum of spindle 118, translation platform 182, pressure foot 106, drill bracket 120, flat angle drill 110, and clamp 108.

Referring generally to FIG. 1 and particularly to e.g. FIGS. 3-5, 14 and 15, in one example, counterbalance 176 may operatively couple translation platform 182 to base 116 to provide and/or control linear movement of translation platform 182 (e.g., and also spindle 118, pressure foot 106, drill bracket 120, flat angle drill 110, and clamp 108) relative to base 116 along drilling axis A. Counterbalance 176 may bias spindle 118, translation platform 182, pressure foot 106, drill bracket 120, flat angle drill 110, and clamp 108 against the gravitational force exerted on spindle 118, translation platform 182, pressure foot 106, drill bracket 120, flat angle drill 110, and clamp 108 in order to maintain a linear position of spindle 118, translation platform 182, pressure foot 106, drill bracket 120, flat angle drill 110, and clamp 108 relative to base 116 along drilling axis A until the clamping operation is performed. As one general, non-limiting example, counterbalance 176 may include one or more pneumatic cylinders 250 (FIG. 15) capable of exerting force $F_5$ (e.g., a biasing or spring force) upon spindle 118, translation platform 182, pressure foot 106, drill bracket 120, flat angle drill 110, and clamp 108.

Referring generally to FIG. 1 and particularly to e.g. FIGS. 3-5 and 12-14, in one example construction, counterbalance 176 may be interconnected between base 116 and translation platform 182. As one example, pneumatic cylinders 250 may be fixedly connected to base frame 252 of base 116 and operatively connected to rail 246 of translation platform 182.

As one example implementation of a positioning operation for processing workpiece 102, clamp 108 may be linearly moved away from pressure foot 106 (e.g., relative to pressure foot 106) along drilling axis A (e.g., to open clamp 108). For example, frame 122 may be linearly moved away from pressure foot 106 (e.g., relative to pressure foot 106) along drilling axis A by clamp drive mechanism 184 to open clamp 108. Clamp 108 (e.g., frame 122) may be moved a sufficient distance from pressure foot 106 such that workpiece 102 may be positioned between clamp 108 and pressure foot 106, for example, in preparation for the clamping operation. End effector 104 may be positioned relative to workpiece 102 (e.g., adjacent to workpiece 102). For example, workpiece 102 may be positioned between pressure foot 106 and clamp 108 and drilling axis A of flat angle drill 110 (e.g., drill bit 198) may be aligned with drilling location 148.

In one example implementation of the clamping operation, clamp 108 may be linearly moved toward pressure foot 106 (e.g., relative to pressure foot 106) and workpiece 102 along drilling axis A (e.g., to close clamp 108). For example, frame 122 may be linearly moved toward pressure foot 106 and workpiece 102 along drilling axis A by clamp drive mechanism 184 to close clamp 108 and contact surface 202 by jaw 166. When clamp 108 contacts workpiece 102, clamp 108 may draw end effector 104 toward workpiece 102 to contact workpiece 102 by pressure foot 106. For example, when jaw 166 of frame 122 contacts surface 202 of workpiece 102, clamp drive mechanism 184 may act upon pressure foot 106 to linearly move pressure foot 106, spindle 118, drill bracket 120, flat angle drill 110, and translation platform 182 relative to base 116 along drilling axis A to contact surface 198 of workpiece 102 with pressure foot 106. A robot control algorithm may be utilized to monitor a gravity multiplier (e.g., a gravitational force vector) to control force $F_5$ exerted by counterbalance 176 and ensure that end effector 104 (e.g., pressure foot 106, spindle 118, drill bracket 120, flat angle drill 110, and translation platform 182) moves linearly in a controlled manner relative to base 116 along drilling axis A in response to force $F_6$ exerted on workpiece 102 by clamp 108 (e.g., force exerted by clamp drive mechanism 184 on pressure foot 106 to draw pressure foot 106, spindle 118, drill bracket 120, flat angle drill 110, and translation platform 182 toward workpiece 102). Thus, the clamping operation exerts a suitable clamping force on workpiece 102 between clamp 108 and pressure foot 106 without damaging (e.g., deforming or gauging) workpiece 102 with clamp 108 or pressure foot 106.

Referring generally to FIG. 1 and particularly to e.g. FIGS. 3-5, the instant paragraph pertains to example 6 of the present disclosure. In example 6, which includes the subject matter of example 5, end effector 104 is capable of biasing clamp 108 toward workpiece 102 with force $F_6$. Force $F_6$ has magnitude $M_6$ greater than an absolute value of a difference between magnitude $M_5$ of force $F_5$ and magnitude $M_g$ of the gravitational force corresponding to the weight sum of spindle 118, translation platform 182, pressure foot 106, drill bracket 120, flat angle drill 110, and clamp 108.

As one example, force $F_6$ may be generated by clamp drive mechanism 184. As described herein above, clamp drive mechanism 184 may exert force $F_6$ on workpiece to draw end effector 104 (e.g., pressure foot 106, spindle 118, drill bracket 120, flat angle drill 110, and translation platform 182) toward workpiece 102 during the clamping operation.

In one example implementation of processing workpiece 102, force $F_6$ may be directed in an opposing direction from force $F_5$. For example, when end effector 104 is in a right-side up orientation, force $F_5$ may oppose the gravitational force corresponding to a weight sum of spindle 118, translation platform 182, pressure foot 106, drill bracket 120, flat angle drill 110, and clamp 108 and be directed away from workpiece 102. Force $F_6$ may be directed toward workpiece 102 and in the opposite direction from force F5 to draw spindle 118, translation platform 182, pressure foot 106, drill bracket 120, and flat angle drill 110 relative to base 116 along drilling axis A toward workpiece 102.

As used herein, "right-side up orientation" means an orientation of end effector 104 in which spindle 118, translation platform 182, pressure foot 106, drill bracket 120, and flat angle drill 110 are positioned vertically above clamp 108, as best illustrated in FIGS. 2 and 3.

In one example implementation of processing workpiece 102, force $F_6$ may be directed in the same direction as force $F_5$. For example, when end effector 104 is in an upside down orientation, force $F_5$ may oppose the gravitational force corresponding to a weight sum of spindle 118, translation platform 182, pressure foot 106, drill bracket 120, flat angle drill 110, and clamp 108 and be directed toward workpiece 102. Force $F_6$ may be directed toward workpiece 102 and in the same direction as force F5 to draw spindle 118, translation platform 182, pressure foot 106, drill bracket 120, and flat angle drill 110 relative to base 116 along drilling axis A toward workpiece 102.

As used herein, "upside down orientation" means an orientation of end effector 104 in which spindle 118, translation platform 182, pressure foot 106, drill bracket 120, and flat angle drill 110 are positioned vertically below clamp 108 (e.g., rotated 180 degrees from the right-side up orientation).

Referring generally to FIG. 1 and particularly to e.g. FIG. 5, the instant paragraph pertains to example 7 of the present disclosure. In example 7, which includes the subject matter of example 6, magnitude $M_5$ is greater than magnitude $M_g$.

For example, magnitude $M_5$ of force $F_5$ may be greater than magnitude $M_g$ of the gravitational force corresponding to the weight sum of spindle 118, translation platform 182, pressure foot 106, drill bracket 120, flat angle drill 110, and clamp 108 when end effector 104 is in the right-side up orientation in order to adequately bias spindle 118, translation platform 182, pressure foot 106, drill bracket 120, flat angle drill 110, and clamp 108 away from workpiece 102 and maintain spindle 118, translation platform 182, pressure foot 106, drill bracket 120, flat angle drill 110, and clamp 108 at a linear position relative to base 116 along drilling axis A. Magnitude $M_6$ of force $F_6$ may be sufficient to overcome magnitude $M_5$ of force $F_5$ to draw spindle 118, translation platform 182, pressure foot 106, drill bracket 120, and flat angle drill 110 toward workpiece 102 during the clamping operation.

Referring generally to FIG. 1 and particularly to e.g. FIG. 5, the instant paragraph pertains to example 8 of the present disclosure. In example 8, which includes the subject matter of example 6, magnitude $M_5$ is less than magnitude $M_g$.

For example, magnitude $M_5$ of force $F_5$ may be less than magnitude $M_g$ of the gravitational force corresponding to the weight sum of spindle 118, translation platform 182, pressure foot 106, drill bracket 120, flat angle drill 110, and clamp 108 when end effector 104 is in the upside down orientation in order to assist clamp 108 to draw spindle 118, translation platform 182, pressure foot 106, drill bracket 120, flat angle drill 110, and clamp 108 toward workpiece 102 relative to base 116 along drilling axis A. A combination of magnitude $M_6$ of force $F_6$ and magnitude $M_5$ of force $F_5$ may be sufficient to overcome magnitude $M_g$ of the gravitational force corresponding to the weight sum of spindle 118, translation platform 182, pressure foot 106, drill bracket 120, flat angle drill 110, and clamp 108 to draw spindle 118, translation platform 182, pressure foot 106, drill bracket 120, and flat angle drill 110 toward workpiece 102 during the clamping operation.

Referring generally to FIG. 1 and particularly to e.g. FIGS. 3 and 5-7, the instant paragraph pertains to example 9 of the present disclosure. In example 9, which includes the subject matter of any of examples 2-8, flat angle drill 110 comprises housing 126. Drilling axis A passes through housing 126. Drill bracket 120 comprises drill brace 128 in contact with housing 126 of flat angle drill 110. Drill brace 128 produces reaction force $F_2$ equal and opposite to action force $F_1$ transmitted to housing 126 of flat angle drill 110 along drilling axis A during drilling operation.

Referring generally to FIG. 1 and particularly to e.g. FIGS. 5-7 and 11, in one example construction, housing 126 may include housing surface 258 and drill brace 128 may include drill brace surface 260. When flat angle drill 110 is coupled to spindle 118 and retained, for example, in the clocked orientation, by drill bracket 120, drill brace surface 260 may be in contact with and engage housing surface 258. Drill brace surface 260 may produce reaction force $F_2$ through contact with housing surface 258. Reaction force $F_2$ being equal and opposite to action force $F_1$ transmitted to housing 126 of flat angle drill 110 along drilling axis A during drilling operation. Drill brace surface 260 may be complimentary to housing surface 260. As one example, both housing surface 258 and drill brace surface 260 may be flat. As one example, housing surface 258 may include an outward projection or may be outwardly curved (e.g., convex) and drill brace surface 260 may include a complimentary inward recess or may be inwardly curved (e.g., concave).

Referring generally to FIG. 1 and particularly to e.g. FIGS. 3, 4, 6, and 7, the instant paragraph pertains to example 10 of the present disclosure. In example 10, which includes the subject matter of example 9, drill bracket 120 further comprises split clamp 130 capable of preventing rotation of housing 126 of flat angle drill 110 relative to drill brace 128.

Referring generally to FIG. 1 and particularly to e.g. FIGS. 6, and 7, in one example construction, split clamp 130 may engage hexagonal retainer 146 to retain flat angle drill 110 in the clocked orientation relative to drill bracket 120 and prevent rotation of flat angle drill 110 (e.g., housing 126) relative to drill bracket 120.

Referring generally to FIG. 1 and particularly to e.g. FIGS. 3-5, 7, and 8, the instant paragraph pertains to example 11 of the present disclosure. In example 11, which includes the subject matter of any of examples 1-8, flat angle drill 110 comprises housing 126. Pressure foot 106 comprises recess 152 capable of at least partially receiving housing 126 of flat angle drill 110. Drilling axis A passes through housing 126 and recess 152.

Referring generally to FIG. 1 and particularly to e.g. FIGS. 3-5, 7, and 8, in one example construction, recess 152 may include a peripheral shape substantially matching a perimeter edge shape of housing 126. Recess 152 may include a depth substantially equal to a thickness of housing 126. Recess 152 may center and/or stabilize flat angle drill 110 when housing 126 is received within recess 152. During the drilling operation, housing 126 may be received within recess 152 as spindle 118 and flat angle drill 110 move linearly toward workpiece 102 along drilling axis A. Pressure foot 106 may include drill bit aperture 272 aligned within recess 152, such that drill bit 196 extends through drill bit aperture 272 when housing is received within recess 152.

In one example construction, pressure foot 106 may include first foot member 262 and second foot member 264. First foot member 262 may define a portion of pressure foot 106 facing flat angle drill 110. Second foot member 264 may define a portion of pressure foot 106 facing and to contact workpiece 102 during processing of workpiece 102 (e.g., during the clamping operation).

In one example construction, first foot member 262 may include pressure foot mounting frame 266 and flat angle drill receiving member 268. Pressure foot mounting frame 266 may be fixedly connected to translation assembly 182 (e.g., rail 246). Flat angle drill receiving member 268 may extend substantially perpendicularly from pressure foot mounting frame 266. Flat angle drill receiving member 268 may include flat angle drill aperture 270 (e.g., a through aperture) suitably sized to receive flat angle drill 110 (e.g., housing 126). Second foot member 264 may be coupled to first foot member 262, for example, to flat angle drill receiving member 268. Second foot member 264 may partially enclose flat angle drill aperture 270 when connected to first foot member 262 to define recess 152. Second foot member 264 may include drill bit aperture 272 (e.g., a through aperture). Drill bit aperture 272 may be aligned with, for example, proximate an end of, flat angle drill aperture 270 when second foot member 264 and first foot member 262 are connected such that drill bit 196 extends through drill bit aperture 272 when housing 126 is received within recess 152.

In one example construction, second foot member 264 may include end member 276 and cap member 278. Cap member 276 may be connected to end member 276. Drill bit aperture 272 may be disposed through cap member 276.

Referring generally to FIG. 1 and particularly to e.g. FIGS. 3, 4, 8, 14, 15, 18 and 19, the instant paragraph pertains to example 12 of the present disclosure. In example 12, which includes the subject matter of any of examples 1-11, apparatus 100 further comprises lubricant source 186 and vacuum source 188. Pressure foot 106 is fluidly coupled to lubricant source 186 and vacuum source 188.

Referring generally to FIG. 1 and particularly to e.g. FIGS. 3, 4, 8, 14, 15, 18 and 19, in one example construction, vacuum source 188 may be any suitable mechanism or device capable of generating a vacuum airflow to pressure foot 106, for example to drill bit aperture 272. The vacuum airflow may vacuum and remove any waste material created during the drilling operation. As one example, vacuum source 188 may include a vacuum pump. Vacuum source 188 may be located on or connected to, for example, robot 112 or base 116. Vacuum source 188 may be fluidly coupled to pressure foot 106 via vacuum tube 274.

Referring generally to FIG. 1 and particularly to e.g. FIGS. 3, 4, 8, 14, 15, 18 and 19, in one example construction, lubricant source 186 may be any suitable mechanism or device capable of delivering lubricant (e.g., cutting lubricant) to pressure foot 106, for example, to drill bit aperture 272. The lubricant may lubricate drill bit 196 and drilling location 148. As one example, lubricant source 186 may include lubricant pump. Lubricant source 186 may be connected to base 116. Lubricant source 186 may be fluidly coupled to pressure foot 106 via a lubricant tube 280 (FIG. 19).

Referring generally to FIG. 1 and particularly to e.g. FIGS. 3, 4, 8, 14, 15, 18 and 19, in an example construction, vacuum tube 274 and lubricant tube 280 may be connected to vacuum-lubricant attachment 282. Vacuum-lubricant attachment 282 may be connected to pressure foot 106 to fluidly interconnect lubricant source 186 and vacuum source 188 to pressure foot 106. The vacuum-lubricant attachment 282 may include both incorporates vacuum circuit capable of controlling a vacuum airflow and a lubricant circuit capable of controlling a flow of lubricant.

Referring generally to FIG. 1 and particularly to e.g. FIGS. 3, 4, and 8, the instant paragraph pertains to example 13 of the present disclosure. In example 13, which includes the subject matter of example 12, pressure foot 106 further comprises vacuum port 190 in fluid communication with vacuum source 188 and lubricant port 192 in fluid communication with lubricant source 186.

Referring generally to FIG. 1 and particularly to e.g. FIGS. 3, 4, 8, 14, 15, 18 and 19, in one example construction, vacuum port 190 and lubricant port 192 may be in fluid communication with drill bit aperture 272 in order to apply vacuum airflow and/or lubricant to drill bit 196 positioned within drill bit aperture 272 during the drilling operation. In one example construction, pressure foot 106 may include at least one vacuum channel 282 fluidly interconnected between vacuum source 188 and vacuum port 190. Pressure foot may include at least one lubricant channel 284 fluidly interconnected between lubricant source 186 and lubricant port 192. As an example, vacuum-lubricant attachment 282 may be fluidly connected to both vacuum channel 284 and lubricant channel 286. Vacuum channel 284 and lubricant channel 286 may extend through (e.g., be machine in) pressure foot 106 from an attachment location of vacuum-lubricant attachment 282 to vacuum port 190 and lubricant port 192, respectively, for example, within drill bit aperture 272. As an example, vacuum channel 284 and lubricant channel 286 may extend through pressure foot mounting frame 266 of first foot member 262 and extend through end member 276 and cap member 278 of second foot member 264 to vacuum port 190 and lubricant port 192, respectively, for example, within drill bit aperture 272.

Referring generally to FIG. 1 and particularly to e.g. FIGS. 3-5, the instant paragraph pertains to example 14 of the present disclosure. In example 14, which includes the subject matter of any of examples 1-13, clamp 108 comprises frame 122 that is G-shaped.

Referring generally to FIG. 1 and particularly to e.g. FIGS. 2-5, frame 122, having the G-shape, may provide (e.g., improved) access to workpiece 102 being processed by apparatus 100. As one example, an upturned portion of the G-shape of frame 122 may allow clamp 108 to contact workpiece 102 (e.g., surface 200) avoiding obstruction 150.

Referring generally to FIG. 1 and particularly to e.g. FIGS. 3-5, the instant paragraph pertains to example 15 of the present disclosure. In example 15, which includes the subject matter of example 14, frame 122 comprises base member 168 comprising first end 162 and second end 164, first arm member 170 extending substantially perpendicularly from first end 162 of base member 168, second arm member 172 extending substantially perpendicularly from second end of base member 168, extension member 174 extending substantially perpendicularly from second arm member 172 and substantially parallel to base member 168, and jaw 166 at an end of extension member 174. Jaw 166 is aligned with pressure foot 106 and faces flat angle drill 110.

Referring generally to FIG. 1 and particularly to e.g. FIGS. 2-5, as one example, jaw 166 may contact workpiece 102 (e.g., surface 200 of workpiece 102) during the clamping operation. In one example construction, terminal end 202 of jaw 166 may include a tip (e.g., terminate at a point). Obstruction 150 (e.g., proximate drilling location 148) may be avoided during the clamping operation (e.g., contact with surface 200 by jaw 166) by second arm member 172 of frame 122 being spaced away from from obstruction 150 and/or surface 200 by extension member 174. As one example, and as best illustrated in FIG. 5, obstruction 150 may include a flange extending from surface 200. Frame 122 may clear obstruction 150 such that jaw 166 may contact workpiece 102 (e.g., surface 200). As one example, obstruction 150 may include a plurality of spaced apart reinforcing ribs disposed on surface 200. Tip 202 of jaw 166 may clear obstruction 150 (e.g., fit between adjacent reinforcing ribs) such that jaw 166 may contact workpiece 102 (e.g., surface 200).

Referring generally to FIG. 1 and particularly to e.g. FIGS. 2-4, the instant paragraph pertains to example 16 of the present disclosure. In example 16, which includes the subject matter of any of examples 1-15, apparatus 100 further comprises robot 112 and tool changer 114 coupled to robot 112. End effector 104 is coupled to tool changer 114.

Referring generally to FIG. 1 and particularly to e.g. FIG. 2, robot 112 may include any multipurpose manipulator of end effector 104 that is automatically controlled, programmable in three or more axes, and reprogrammable to position end effector 104 relative to workpiece 102 during the drilling operation.

Referring generally to FIG. 1 and particularly to e.g. FIG. 2-4, tool changer 114 may include any suitable robotic tool changer capable of coupling end effector 104 to robot 112 and changing from one end effector to another end effector or other peripheral tooling. As one example, end effector 104 may be mechanically connected to tool changer 114, electrically connected to tool changer 114, hydraulically connected to tool changer 114, pneumatically connected and/or vacuum connected to tool changer 114. In one example construction, base 116 may be coupled to tool changer 114. As one example, and as best illustrated in FIG. 4, tool changer 114 may include tool changer coupling 216 including one or more fittings (e.g., mechanical, electrical, hydraulic, pneumatic, and/or vacuum fittings and/or circuits) and base 116 may include base coupling 218 including one or more corresponding fittings capable of connecting base 116 to tool changer 114. End effector 104 may be rotationally movable relative to tool changer 114. As one example, base 116 may be rotatably connected to or rotationally movable to a plurality of rotational positions relative to tool changer 114. A locking mechanism (not shown), for example, a dowel pin, may be used to retain end effector 104 (e.g., base 116) at a desired rotational orientation relative to tool changer 114. As one specific, non-limiting example, tool changer 114 may include a robotic quick-change tool changer assembly commercially available from ATI Industrial Automation, 1031 Goodworth Dr., Apex, N.C. 27539.

Referring e.g., to FIGS. 1 and 3-7, the instant paragraph pertains to example 17 of the present disclosure. Example 17 relates to drill bracket 120 for coupling flat angle drill 110 to spindle 118 of end effector 104. Flat angle drill 110 comprises housing 126, hexagonal retainer 146 connected to housing 126, and drilling axis A passing through housing 126. Drill bracket 120 comprises drill brace 128 capable of generating reaction force $F_2$ equal and opposite to action force $F_1$ transmittable to flat angle drill 110 along drilling axis A during a drilling operation, and split clamp 130 capable of preventing rotation of housing 126 of flat angle drill 110 relative to drill brace 128.

Referring generally to FIG. 1 and particularly to e.g. FIGS. 3, 4, 6, and 7, the instant paragraph pertains to example 18 of the present disclosure. In example 18, which includes the subject matter of example 17, split clamp 130 comprises first bracket member 132 comprising first arcuate clamping surface 134, second bracket member 136 comprising second arcuate clamping surface 138, and bushing 140 comprising cylindrical outer surface 142 and hexagonal inner surface 144 capable of receiving hexagonal retainer 146 connected to housing 126 of flat angle drill 110. First bracket member 132 and second bracket member 136 are capable of rotationally constraining cylindrical outer surface 142 of bushing 140 between first arcuate clamping surface 134 and second arcuate clamping surface 138.

Referring generally to FIG. 1 and particularly to e.g. FIGS. 3, 4, 6, 7 and 20, in one example construction, first bracket member 132 may be connected to second bracket member 136 to align first arcuate clamping surface 134 and second arcuate clamping surface 138 to form annular aperture (not visible in FIGs.). Bushing 140 may receive hexagonal retainer 146 and be positioned within annular aperture (e.g., within opposed first arcuate clamping surface 134 and second arcuate clamping surface 138). First bracket member 132 and second bracket member 136 may be tightened together to compress (e.g., frictionally retain) bushing 140 (e.g., cylindrical outer surface 142) between first arcuate clamping surface 134 and second arcuate clamping surface 138 at the clocked orientation.

During the drilling operation, drilling axis A may be required to be located at and maintained at a suitable (e.g., known and repeatable) rotational (e.g., angular) position (e.g., clocked orientation) relative to end effector 104 (e.g., rotational axis A), such that drill bit 196 may be located at and maintained at the suitable rotational position relative to rotational axis A. Thus, flat angle drill 110 may need to be rotationally positioned (e.g., clocked) at a particular rotational position relative to drill bracket 120 and spindle 118 such that drilling axis A is at the suitable location relative to end effector 104. However, in certain constructions (e.g., commercially available constructions), hexagonal retainer 146 may be affixed (e.g., soldered) to housing 126 at various inconsistent rotational orientations relative to housing 126. As one example, the rotational orientation of hexagonal retainer 146 relative to housing 126 may vary as much as +/− six degrees. Connection of housing 126 to bushing 140 (e.g., by receiving hexagonal retainer 146 of housing 126 within hexagonal inner surface 144 of bushing 140) may allow infinite rotational (e.g., angular) positioning (e.g., clocking) of flat angle drill 110 (e.g., housing 126) relative to drill bracket 120 and spindle 118 prior to retaining bushing 140 within split clamp 130 (e.g., between first arcuate clamping surface 134 and second arcuate clamping surface 138) at the suitable rotational position (e.g., clocked orientation).

Referring generally to FIG. 1 and particularly to e.g. FIGS. 3, 4, 6, 7, 10 and 11, in one example construction, drill bracket 120 may be fixedly connected to spindle 118. Thus, linear motion of spindle 118 relative to translation platform 182 (e.g., vie spindle drive mechanism 124) along drilling axis A may translate to linear motion of drill bracket 120 and flat angle drill 110 relative to translation platform 182 along drilling axis A.

As one example, drill bracket 120 may include third bracket member 288. Third bracket member 288 may be connected to first bracket member 132 and second bracket member 136. Third bracket member 288 may be connected to spindle 118. As one example, third bracket member 288 may be fixedly connected to spindle mounting plate 254.

Referring generally to FIG. 1 and particularly to e.g. FIGS. 5-7, the instant paragraph pertains to example 19 of the present disclosure. In example 19, which includes the subject matter of example 17, drill brace 128 is in contact with housing 126 of flat angle drill 110.

Referring generally to FIG. 1 and particularly to e.g. FIGS. 3, 4, 6, 7, 10 and 11, in one example construction, drill brace 128 may be connected to first bracket member 132 and second bracket member 136. As one example, drill brace 128 may be located directly over housing 126 of flat angle drill 110 with drill brace surface 260 being in contact with housing surface 258 to generate reaction force $F_2$ equal and opposite to action force $F_1$ transmitted to flat angle drill 110 along drilling axis A during the drilling operation.

Referring generally to FIG. 1 and particularly to e.g. FIGS. 4, 18 and 19, the instant paragraph pertains to an example of the present disclosure, which includes the subject matter of any of examples 1-19. In an example construction, apparatus 100 may include imaging sensor 290. Imaging sensor 290 may be fixedly connected to pressure foot 106 and may move linearly relative to translation platform 182 along drilling axis A (e.g., with pressure foot 106). Imaging sensor 290 may include any imaging system or device suitable to located and/or monitor workpiece 102, surface 198, and/or drilling location 148. As one example, imaging sensor 290 may include camera 292 and/or laser positioning (e.g., alignment) sensor 294.

Referring generally to FIGS. 1-8 and 10-19, end effector 104 may include a variety of connecting fasteners, mounting brackets, and/or similar hardware for connecting spindle 118, translation platform 182, pressure foot 106, drill bracket 120, flat angle drill 110, clamp 108, base 116, spindle drive mechanism 124, and clamp drive mechanism 184 to one another and/or together. Such fasteners, brackets, and/or hardware may be illustrated in drawings and not specifically identified in the present description. Such fasteners, brackets, and/or hardware may not be specifically identified in the present disclosure and/or accompanying drawings.

Those skilled in the art will recognize that the examples of the spindle 118, translation platform 182, pressure foot 106, drill bracket 120, flat angle drill 110, clamp 108, base 116, spindle drive mechanism 124, and clamp drive mechanism 184 may include more components, less components, and/or different components that those described and/or illustrated without effecting the scope of the present disclosure.

Referring e.g. to FIG. 9, the instant paragraph pertains to example 20 of the present disclosure. Example 20 relates to method 500 for processing drilling location 148 in confined area 154 of workpiece 102 along drilling axis A using end effector 104. Method 500 comprises positioning end effector 104 relative to drilling location 148 of workpiece 102 (block 202) and clamping workpiece 102 between clamp 108 of end effector 104 and pressure foot 106 of end effector 104 (block 204). Pressure foot 106 supports clamp 108 movable relative to pressure foot 106. Method 500 further comprises drilling workpiece 102 with flat angle drill 110 of end effector 104 (block 206).

Referring, e.g. to FIG. 9, the instant paragraph pertains to example 21 of the present disclosure. In example 21, which includes the subject matter of example 20, clamping workpiece 102 between clamp 108 and the pressure foot 106 comprises exerting action force $F_3$ upon workpiece 102 by contacting workpiece 102 with clamp 108 biased toward workpiece 102 in a first direction (block 208), and exerting reaction force $F_4$, equal and opposite to action force $F_3$, upon workpiece 102 by contacting workpiece 102 with pressure foot 106 biased toward workpiece 102 in a second direction opposite to the first direction (block 210).

Referring e.g. to FIG. 9, the instant paragraph pertains to example 22 of the present disclosure. In example 22, which includes the subject matter of example 21, method 500 further comprises avoiding obstruction 150 proximate drilling location 148 with frame 122 of clamp 108 when exerting action force $F_3$ upon workpiece 102 by spacing second arm member 172 of frame 122 from obstruction 150 using extension member 174 coupled to second arm member 172 (block 212).

Referring generally to FIG. 9, the instant paragraph pertains to example 23 of the present disclosure. In example 23, which includes the subject matter of any of examples 21-22, clamping workpiece 102 between clamp 108 and pressure foot 106 further comprises biasing pressure foot 106, supporting clamp 108, with force $F_5$ along drilling axis A (block 214). Force $F_5$ is directionally opposite to a gravitational force corresponding to a weight sum of spindle 118 of end effector 104, translation platform 182 of end effector 104, pressure foot 106, drill bracket 120 of end effector 104, flat angle drill 110, and clamp 108. Clamping workpiece 102 between clamp 108 and pressure foot 106 further comprises biasing clamp 108 toward workpiece 102 with force $F_6$ (block 216). Force $F_6$ has magnitude $M_6$ greater than an absolute value of a difference between magnitude $M_5$ of force $F_5$ and magnitude $M_g$ of the gravitational force corresponding to the weight sum of spindle 118, translation platform 182, pressure foot 106, drill bracket 120, flat angle drill 110, and clamp 108. The difference between magnitude $M_6$ and magnitude $M_5$ is equal to magnitude $M_4$ of force $F_4$.

Referring generally to FIG. 9, the instant paragraph pertains to example 24 of the present disclosure. In example 24, which includes the subject matter of example 23, magnitude M5 is greater than magnitude Mg.

Referring generally to FIG. 9, the instant paragraph pertains to example 25 of the present disclosure. In example 25, which includes the subject matter of example 23, magnitude M5 is less than magnitude Mg.

Referring generally to FIG. 9, the instant paragraph pertains to example 26 of the present disclosure. In example 26, which includes the subject matter of any of examples 20-25, method 500 further comprises accessing confined area 154 with flat angle drill 110, and aligning drilling axis A of flat angle drill 110 with drilling location 148 (block 218).

Referring generally to FIG. 9, the instant paragraph pertains to example 27 of the present disclosure. In example 27, which includes the subject matter of any of examples 20-26, method 500 further comprises opposing action force $F_1$, transmitted to flat angle drill 110 along drilling axis A during the processing of drilling location 148, with reaction force $F_2$ produced by drill brace 128 of end effector 104. Reaction force F2 is equal and opposite to action force F1 (block 222).

Examples of the present disclosure may be described in the context of aircraft manufacturing and service method 1100 as shown in FIG. 21 and aircraft 1102 as shown in FIG. 22. During pre-production, illustrative method 1100 may include specification and design block 1104 of aircraft 1102 and material procurement block 1106. During production, component and subassembly manufacturing block 1108 and system integration block 1110 of aircraft 1102 may take place. Thereafter, aircraft 1102 may go through certification and delivery block 1112 to be placed in service block 1114. While in service, aircraft 1102 may be scheduled for routine maintenance and service block 1116. Routine maintenance and service may include modification, reconfiguration, refurbishment, etc. of one or more systems of aircraft 1102.

Each of the processes of illustrative method 1100 may be performed or carried out by a system integrator, a third party, and/or an operator e.g., a customer. For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 22, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus and methods shown or described herein may be employed during any one or more of the stages of the manufacturing and service method 1100. For example, components or subassemblies corresponding to component and subassembly manufacturing 1108 may be fabricated or manufactured in a manner similar to components or subassemblies produced while aircraft 1102 is in service. Also, one or more examples of the apparatus, method, or combination thereof may be utilized during production stages 1108 and 1110, for example, by substantially expediting assembly of or reducing the cost of aircraft 1102. Similarly, one or more examples of the apparatus or method realizations, or a combination thereof, may be utilized, for example and without limitation, while aircraft 1102 is in service, e.g., maintenance and service stage block 1116.

Different examples of the apparatus and methods disclosed herein include a variety of components, features, and functionalities. It should be understood that the various examples of the apparatuses and methods disclosed herein may include any of the components, features, and functionalities of any of the other examples of the apparatuses and methods disclosed herein in any combination, and all of such possibilities are intended to be within the spirit and scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples presented and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims.

What is claimed is:

1. A method for processing a drilling location in a confined area of a workpiece that has a first side and a second side, located opposite the first side, along a drilling axis using an end effector, the method comprising steps of:
    positioning the end effector relative to the drilling location of the workpiece, and wherein the end effector comprises:
        a base;
        a translation platform, coupled to and moveable relative to the base;
        a pressure foot, coupled to the translation platform and movable relative to the base;
        a spindle, coupled to the translation platform and movable relative to the pressure foot;
        a drill bracket, coupled to the spindle;
        a flat angle drill, coupled to the drill bracket and operatively coupled with the spindle;
        a clamp, coupled to and movable relative to the pressure foot;
        a clamp drive mechanism, operatively coupled with the pressure foot and the clamp; and
        a counterbalance mechanism, operatively coupled with the base and the translation platform;
    coupling a bushing to a hexagonal retainer of the flat angle drill wherein the bushing comprises a cylindrical outer surface and a hexagonal inner surface configured to receive the hexagonal retainer;
    rotationally positioning the drilling axis of the flat angle drill in a selected clocked orientation relative to a rotational axis of the spindle;
    clamping the bushing between a first arcuate clamping surface of a first bracket member of the drill bracket and a second arcuate clamping surface of a second bracket member of the drill bracket at the selected clocked orientation, wherein the first bracket member and the second bracket member are coupled to each other and to the spindle;
    counterbalancing a weight sum of the translation platform, the pressure foot, the spindle, the drill bracket, the flat angle drill, the clamp, and the clamp drive mechanism using the counterbalance mechanism;
    moving the clamp relative to the pressure foot along the drilling axis into contact with the first side of the workpiece using the clamp drive mechanism;
    moving the pressure foot relative to the clamp and relative to the base along the drilling axis into contact with the second side of the workpiece using the clamp drive mechanism;
    clamping the workpiece between the clamp and the pressure foot; and
    drilling the workpiece with the flat angle drill.

2. The method of claim 1, further comprising:
    accessing the confined area with the flat angle drill; and
    aligning the drilling axis of the flat angle drill with the drilling location.

3. The method of claim 1, further comprising opposing an action force $F_1$ transmitted to the flat angle drill along the drilling axis with a reaction force $F_2$ produced by a drill brace of the end effector, wherein the reaction force $F_2$ is equal and opposite to the action force $F_1$.

4. The method of claim 1, wherein the step of clamping the workpiece between the clamp and the pressure foot comprises:
    exerting an action force $F_3$ upon the workpiece by contact of the workpiece with the clamp biased toward the workpiece in a first direction; and
    exerting a reaction force $F_4$, equal and opposite to the action force $F_3$, upon the workpiece by contact of the workpiece with the pressure foot biased toward the workpiece in a second direction opposite to the first direction.

5. The method of claim 4, further comprising:
    accessing the confined area with the flat angle drill; and
    aligning the drilling axis of the flat angle drill with the drilling location.

6. The method of claim 5, further comprising opposing an action force $F_1$ transmitted to the flat angle drill along the drilling axis with a reaction force $F_2$ produced by a drill brace of the end effector, wherein the reaction force $F_2$ is equal and opposite to the action force $F_1$.

7. The method of claim 4, further comprising:
biasing the pressure foot, supporting the clamp, with a force $F_5$ along the drilling axis, wherein the force $F_5$ is directionally opposite to a gravitational force corresponding to the weight sum of the translation platform, the pressure foot, the spindle, the drill bracket, the flat angle drill, the clamp, and the clamp drive mechanism; and
biasing the clamp toward the workpiece with a force $F_6$, wherein the force $F_6$ has a magnitude $M_6$ greater than an absolute value of a difference between a magnitude $M_5$ of the force $F_5$ and a magnitude $M_g$ of the gravitational force corresponding to the weight sum of the translation platform, the pressure foot, the spindle, the drill bracket, the flat angle drill, the clamp, and the clamp drive mechanism.

8. The method of claim 7, further comprising:
accessing the confined area with the flat angle drill; and
aligning the drilling axis of the flat angle drill with the drilling location.

9. The method of claim 7, further comprising opposing an action force $F_1$ transmitted to the flat angle drill along the drilling axis with a reaction force $F_2$ produced by a drill brace of the end effector, wherein the reaction force $F_2$ is equal and opposite to the action force $F_1$.

10. The method of claim 4, further comprising avoiding an obstruction proximate the drilling location with a frame of the clamp when exerting the action force $F_3$ upon the workpiece by spacing a second arm member of the frame from the obstruction using an extension member coupled to the second arm member.

11. The method of claim 10, further comprising:
accessing the confined area with the flat angle drill; and
aligning the drilling axis of the flat angle drill with the drilling location.

12. The method of claim 10, further comprising opposing an action force $F_1$ transmitted to the flat angle drill along the drilling axis with a reaction force $F_2$ produced by a drill brace of the end effector, wherein the reaction force $F_2$ is equal and opposite to the action force $F_1$.

13. The method of claim 10, further comprising:
biasing the pressure foot, supporting the clamp, with a force $F_5$ along the drilling axis, wherein the force $F_5$ is directionally opposite to a gravitational force corresponding to the weight sum of the translation platform, the pressure foot, the spindle, the drill bracket, the flat angle drill, the clamp, and the clamp drive mechanism; and
biasing the clamp toward the workpiece with a force $F_6$, and wherein:
the force $F_6$ has a magnitude $M_6$ greater than an absolute value of a difference between a magnitude $M_3$ of the force $F_5$ and a magnitude $M_g$ of the gravitational force corresponding to the weight sum of the translation platform, the pressure foot, the spindle, the drill bracket, the flat angle drill, the clamp, and the clamp drive mechanism; and
the difference between the magnitude $M_6$ and the magnitude $M_5$ is equal to a magnitude $M_4$ of the reaction force $F_4$.

14. The method of claim 13, further comprising:
accessing the confined area with the flat angle drill; and
aligning the drilling axis of the flat angle drill with the drilling location.

15. The method of claim 13, further comprising opposing an action force $F_1$ transmitted to the flat angle drill along the drilling axis with a reaction force $F_2$ produced by a drill brace of the end effector, wherein the reaction force $F_2$ is equal and opposite to the action force $F_1$.

16. The method of claim 7, wherein the difference between the magnitude $M_6$ and the magnitude $M_5$ is equal to a magnitude $M_4$ of the reaction force $F_4$.

17. The method of claim 1, further comprising passing a drill bit of the flat angle drill through a drill bit aperture formed through the pressure foot when drilling the workpiece with the flat angle drill, while at least one of applying vacuum airflow to the drill bit aperture and applying lubricant to the drill bit aperture.

18. The method of claim 17, further comprising delivering the vacuum airflow via a vacuum channel that extends through the pressure foot to a vacuum port that is in fluid communication with the drill bit aperture.

19. The method of claim 17, further comprising delivering the lubricant, via a lubricant channel that extends through the pressure foot, to a lubricant port that is in fluid communication with the drill bit aperture.

20. The method of claim 10, wherein the frame comprises:
a base member, comprising a first end and a second end;
a first arm member, extending substantially perpendicularly from the first end of the base member;
a second arm member, extending substantially perpendicularly from the second end of the base member;
an extension member, extending from the second arm member; and
a jaw at an end of the extension member; and
wherein:
the jaw is aligned with the pressure foot and faces the flat angle drill; and
the extension member is substantially perpendicular to the second arm member and is substantially parallel to the base member.

* * * * *